US009156188B2

(12) United States Patent
Merck et al.

(10) Patent No.: US 9,156,188 B2
(45) **Date of Patent: *Oct. 13, 2015**

(54) POWERED SAW INCLUDING DUST CAPTURE APPARATUS

(71) Applicant: Perfect Trac OpCo, LLC, Londonderry, NH (US)

(72) Inventors: John Merck, Londonderry, NH (US); Reginald A. Ronzello, Sr., Palham, NH (US); Timothy H. Crowley, Northwood, NH (US)

(73) Assignee: Perfect Trac OpCo, LLC, Londonderry, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/500,052

(22) Filed: Sep. 29, 2014

(65) Prior Publication Data

US 2015/0013513 A1 Jan. 15, 2015

Related U.S. Application Data

(63) Continuation of application No. 13/829,170, filed on Mar. 14, 2013, now Pat. No. 9,027,542.

(60) Provisional application No. 61/765,003, filed on Feb. 14, 2013.

(51) Int. Cl.

| | |
|---|---|
| ***B28D 7/04*** | (2006.01) |
| ***B28D 1/02*** | (2006.01) |
| ***B23D 59/00*** | (2006.01) |
| ***B28D 7/02*** | (2006.01) |
| ***B28D 1/04*** | (2006.01) |
| *B28D 1/12* | (2006.01) |

(52) U.S. Cl.
CPC *B28D 7/02* (2013.01); *B28D 1/045* (2013.01); *B28D 1/12* (2013.01); *B28D 7/046* (2013.01); *Y10T 83/0453* (2015.04); *Y10T 83/207* (2015.04)

(58) Field of Classification Search
CPC ............. B28D 1/00; B28D 1/02; B28D 1/04; B28D 1/045
USPC ........................................................ 125/13.01
See application file for complete search history.

(56) References Cited

U.S. PATENT DOCUMENTS

| | | | |
|---|---|---|---|
| 1,731,872 | A | 10/1929 | Schons |
| 2,673,725 | A | 3/1954 | Coates |
| 3,301,601 | A | 1/1967 | Zuzelo |

(Continued)

FOREIGN PATENT DOCUMENTS

| | | | |
|---|---|---|---|
| EP | 0636062 | A1 | 2/1995 |

OTHER PUBLICATIONS http://dynatech.com/media/catalog/product/cache/1/image/36fefed10506a6415d44b9 . . . image Oct. 29, 2012.

(Continued)

*Primary Examiner* — Maurina Rachuba
*Assistant Examiner* — Lauren Beronja
(74) *Attorney, Agent, or Firm* — Bergman & Song LLP; Michael Bergman

(57) ABSTRACT

A novel cutting method and apparatus includes a cutting blade adapted to consistently and easily form a desirable kerf in a concrete substrate while capturing substantially all resulting concrete dust.

21 Claims, 23 Drawing Sheets

(56) References Cited

U.S. PATENT DOCUMENTS

| | | | | |
|---|---|---|---|---|
| 3,663,060 | A | 5/1972 | Shatwell | |
| 4,236,356 | A | 12/1980 | Ward | |
| 4,787,362 | A | 11/1988 | Boucher | |
| 4,998,775 | A | 3/1991 | Hollifield | |
| 5,086,750 | A | 2/1992 | Chiuminiatta | |
| 5,125,190 | A | 6/1992 | Buser et al. | |
| 5,167,215 | A * | 12/1992 | Harding, Jr. | 125/13.01 |
| D337,037 | S | 7/1993 | Yelton | |
| 5,241,946 | A | 9/1993 | Yelton | |
| D346,104 | S | 4/1994 | Yelton | |
| 5,305,729 | A | 4/1994 | Chiuminiatta | |
| 5,381,780 | A | 1/1995 | Yelton | |
| 5,570,677 | A | 11/1996 | Chiuminiatta | |
| 5,950,612 | A | 9/1999 | Zuzelo | |
| 6,019,433 | A | 2/2000 | Allen | |
| 6,095,023 | A | 8/2000 | Harada | |
| 6,155,246 | A * | 12/2000 | Yamami et al. | 125/13.01 |
| 6,536,422 | B1 | 3/2003 | Zuzelo | |
| 6,557,261 | B1 | 5/2003 | Buser et al. | |
| 6,568,088 | B1 | 5/2003 | Am Ende | |
| 6,748,660 | B2 | 6/2004 | Buser et al. | |
| 6,935,939 | B1 | 8/2005 | Buser et al. | |
| 7,159,323 | B2 | 1/2007 | Petrenko | |
| 8,061,344 | B2 * | 11/2011 | Dofher | 125/13.01 |
| 8,181,559 | B1 | 5/2012 | Am Ende | |
| 8,209,872 | B1 | 7/2012 | Am Ende | |
| 2002/0017817 | A1 | 2/2002 | Nakayama | |
| 2007/0178815 | A1 | 8/2007 | Buser | |
| 2012/0174905 | A1 * | 7/2012 | Lee | 125/12 |

OTHER PUBLICATIONS http://i.ebayimg.com/t/soff-cut-x-390-walk-behind-electric-concrete-saw-w-carrying . . . image Nov. 14, 2012.

http://www.dustmuzzle.com/dust_collection_floor_preparation/saw_buster.php Internet advertising Oct. 29, 2012.

http://www.dustmuzzle.com/complete_systems_for_dust_collection.php Internet advertising Oct. 29, 2012 (3pp).

http://toolsnob.com/archives/2010/04/ripcart.php Ripcart—A Walk-behind Carriage for Your Circular Saw Nov. 14, 2012 (3pp).

http://acecutting.com/store/130-312-large/core-cut-cc1500e-electric-walk-behind-saw.jpg image Oct. 29, 2012.

http://www.eaauctions.com/item-files/25113/feb-2011-030_main.jpg image Oct. 29, 2012.

http://r3.cygnuspub.com/files/cygnus/imagegcp/2012/mar/600x400/nnongoose_xwitho . . . image Oct. 29, 2012.

http://www.contractorsdirect.com/core/media/media.nl?id=31748&c=494083&h=aa4a57af . . . image Oct. 29, 2012.

https://www.angelfire.com/wi3/jeffiknepper53177/6512s3102.jpg image Oct. 29, 2012.

http://i.ebayimg.com/t/husqvarna-soff-cut-310-walk-behind-early-entry-concrete-saw . . . image Oct. 29, 2012 (4 pp).

http://i.ebayimg.com/t/edco-ds-18-walk-behind-electric-concrete-saw-/00/s/mtiwm . . . Image Nov. 14, 2012.

http://cfnewsads.Thomasnet.com/images/large/006/6171.jpg imagw Oct. 29, 2012.

http://cpwrconstructionsolutions.org/gallery/image/edco%20asb-14%20walk%2 . . . image Oct. 29, 2012.

http://www.dynatech.com/media/catalog/product/cache/1/image/36fefed1a06a6415d.44b9 . . . Image Oct. 31, 2012 (3pp).

http://wwwtoolorbit.com/mk-diamond/MK-diamond-150934.html Internet advertising Oct. 29, 2012 (2pp).

http://www.cpwrconstructionsolutions.org/masonry/solutions/676/walk-behind-masonry-s . . . Internet advertising Oct. 29, 2012 (2pp).

http://dustlesstools.com/dustless shrouds/cuttingshroud/cutting-traveled . . . Internet advertising Nov. 20, 2014 (2pp).

http://www.ussaws.com/joint-cleanout-crack-chasing Internet advertising Nov. 20, 2014.

File History for U.S. Appl. No. 61/765,003 as accessed on Oct. 17, 2014.

File History for U.S. Appl. No. 13/829,170 as accessed on Oct. 17, 2014.

* cited by examiner

POWERED SAW INCLUDING DUST CAPTURE APPARATUS

CROSS-REFERENCE TO RELATED APPLICATIONS

The present application is a continuation of U.S. patent application Ser. No. 13/829,170 filed on Mar. 14, 2013, which in turn claims the benefit of U.S. provisional patent application No. 61/765,003 filed on Feb. 14, 2013, the disclosures of both of which are herewith incorporated by reference herein in their entirety.

FIELD OF THE INVENTION

The present invention relates to material processing systems, methods and apparatus, and more particularly to systems, methods and apparatus for processing materials and collecting a resulting detritus.

BACKGROUND

Concrete has been used as a versatile and durable construction material for thousands of years. Over this time many important improvements have been made to compositions, apparatus and techniques for the use of concrete. One might think that such an extended development time would have allowed the technology to reach stasis. Nevertheless, the application of creativity and diligent effort continues to yield beneficial improvements such as those presented in the present application.

SUMMARY

Having examined and understood a range of previously available devices, the inventors of the present invention have developed a new and important understanding of the problems associated with the prior art and, out of this novel understanding, have developed new and useful solutions and improved devices, including solutions and devices yielding surprising and beneficial results.

The invention encompassing these new and useful solutions and improved devices is described below in is various aspects with reference to several exemplary embodiments, including a preferred embodiment.

In particular, the inventors have observed that despite long-standing efforts to provide effective concrete cutting apparatus, the available technology includes only equipment that is heavy, difficult to transport and to operate, and that releases copious quantities of silica-based concrete dust, representing a significant problem of industrial hygiene and a risk to the health of equipment operators and others in the vicinity of cutting operations. In addition, the concrete dust produced and released by existing cutting apparatus and methods is highly abrasive and, consequently, damaging to equipment including the cutting apparatus and other equipment in the vicinity.

The risk to health and equipment is particularly acute during the actual cutting operation, but persists afterwards if the concrete dust is not removed from the vicinity of the cut. Consequently, significant effort must be devoted to clean-up after any conventional concrete cutting operation. This is especially true, when the cutting operation is conducted within an enclosed facility such as, for example, a manufacturing facility, a residential facility, a medical facility, an office building, a warehouse or any other location where dust produced by a cutting operation will be localize and retained for a long period of time, potentially affecting the health of occupants and any machines or goods produced or stored in the facility.

Based on careful observation and analysis, and creative synthesis, the inventors have now invented equipment that addresses these disadvantages, including equipment that is lighter and more readily transported than equipment having comparable capabilities and which is, moreover, easier to operate and capable of capturing a substantial portion or substantially all of the pulverized concrete dust produced by a sawing operation.

In the instant case, solving the problem of readily providing consistent and easily executed cuts in concrete without releasing large amounts of dust was more difficult than might have been anticipated. As noted above, a variety of equipment has previously been available to cut concrete, and certain approaches have been proposed for collecting the dust produced. For example, U.S. Pat. No. 5,167,215, issued to Harding, Jr. Dec. 1, 1992, describes a concrete saw with a dust removal apparatus that includes a blade guard partially surrounding a circular blade mounted for rotation on the side of the wheel housing and a pivotally mounted funnel mounted on the blade guard; and U.S. Pat. No. 5,819,619, issued to Miller et al. Oct. 13, 1998, describes a dust collection and diversion system for device having a cutting tool. As a practical matter, however, these previous proposals are deficient in their ability to consistently and effectively collect a substantial portion of the concrete dust produced.

It should be noted that, while the various figures show respective aspects of the invention, no one figure is intended to show the entire invention. Rather, the figures together illustrate the invention in its various aspects and principles. As such, it should not be presumed that any particular figure is exclusively related to a discrete aspect or species of the invention. To the contrary, one of skill in the art would appreciate that the figures taken together reflect various embodiments exemplifying the invention.

Correspondingly, references throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

DETAILED DESCRIPTION

Figure 1:
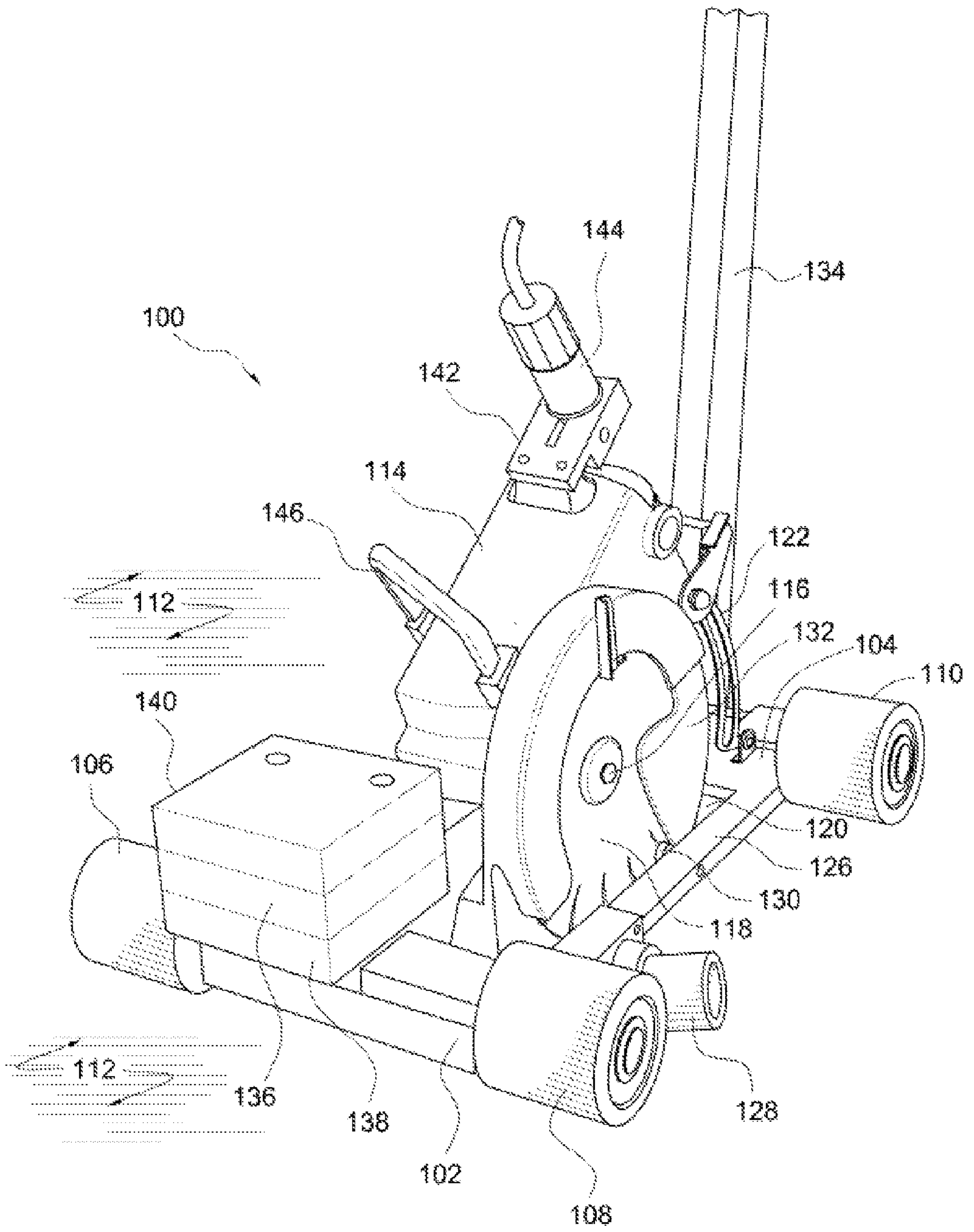
FIG. 1 shows, in a schematic perspective view, a portion of a saw according to principles of the invention.

In describing embodiments of the present invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose.

Further, where parameters for various properties are specified herein for embodiments of the invention, those parameters can be adjusted up or down by 1/100, 1/50, 1/20, 1/10, 1/5, 1/3, 1/2, 3/4, etc. (or up by a factor of 2, 5, 10, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described herein.

Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references optionally may or may not be included in embodiments of this invention.

Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

The foregoing and other features and advantages of various aspects of the invention(s) will be apparent from the following, more-particular description of various concepts and specific embodiments within the broader bounds of the invention (s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 0.1%, 1% or 2% by weight or volume) can be understood as being within the scope of the description; likewise, if a particular shape is referenced, the shape is intended to include imperfect variations from ideal shapes, e.g., due to machining and/or customary tolerances.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "upper," "beneath," "below," "lower," "right," "left," and the like, may be used herein for ease of description to describe the relationship of one element to another element, as illustrated in the figures. It will be understood that the spatially relative terms are intended to encompass different orientations of the apparatus in use or operation in addition to the orientation depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to" or "coupled to" another element, it may be directly on, connected or coupled to the other element or intervening elements may be present unless otherwise specified.

The terminology used herein is for the purpose of describing particular embodiments and is not intended to be limiting of exemplary embodiments. As used herein, the singular forms, "a," "an" and "the," are intended to include the plural forms as well, unless the context clearly indicates otherwise. Additionally, the terms, "includes," "including," "comprises" and "comprising," specify the presence of the stated elements or steps but do not preclude the presence or addition of one or more other elements or steps.

The following description is provided to enable any person skilled in the art to make and use the disclosed inventions and sets forth the best modes presently contemplated by the inventors of carrying out their inventions. In the following description, for purposes of explanation, numerous specific details are set forth in order to provide a thorough understanding of the present invention. It will be apparent, however, to one skilled in the art that the present invention may be practiced without these specific details. In other instances, well-known structures and devices may be shown in block diagram form in order to avoid unnecessarily obscuring the substance disclosed. These and other advantages and features of the invention will be more readily understood in relation to the following detailed description of the invention, which is provided in conjunction with the accompanying drawings.

FIG. 1 shows, in schematic perspective view, portions of an apparatus exemplifying certain aspects of the present invention. Illustrated is a concrete saw 100 having a chassis 102 with an upper surface 104. First 106 and second 108 front wheels and third 110 and fourth (not shown) rear wheels support the chassis above a surface region 112 of a substrate.

While the present disclosure refers to the substrate as concrete, it should be understood that the invention in its various embodiments and aspects is applicable to a wide variety of substrates including, without limitation, asphalt, masonry, stone (including, without limitation, marble, granite, sandstone and fieldstone), ceramics and glasses, natural and synthetic polymeric materials including reinforced polymeric materials, metals and alloys thereof, and organic materials including, for example, wood and wood-based materials, and leather.

The chassis 102 supports saw portion 114 including a motor and power transmission apparatus. As illustrated, the saw portion 114 includes an electric motor, but one of skill in the art will appreciate that a wide variety of other motors will be applied in appropriate circumstances including, for example, pneumatic motors, hydraulic motors, internal combustion engines such as gasoline engines and diesel engines, and external combustion engines such as, for example, steam engines, and Stirling cycle engines, among others.

The saw portion 114 includes an arbor 116 supporting a circular saw blade 118. One of skill in the art will appreciate that the saw blade 118 will be chosen to embody characteristics appropriate for cutting a particular substrate material. Accordingly, where the substrate is concrete, the saw blade may be chosen to include a diamond saw blade or other abrasive saw blade, for example. As will be explained in further detail below, while the present invention is compatible with the use of a saw blade lubricated and cooled by water or other lubricant, the present invention exhibits particular advantages in supporting the use of un-lubricated (i.e., dry) sawing with, for example a dry diamond blade, silicon carbide blade or dry abrasive blade since dry-sawing using conventional apparatus is particularly apt to generate and release undesirable levels of dust and detritus.

In the illustrated embodiment, the blade 118 is adjustably disposed within an aperture 120 through the chassis 102. As will be further discussed below, an adjustment mechanism 122 is provided to control a pivotal orientation of the saw portion 114 with respect to the upper surface 104 and consequently to adjustably control a depth of cut of a particular saw blade. The illustrated adjustment mechanism 122 includes a manual detent lever 124, but one of skill in the art will appreciate that a wide variety of mechanisms may be implemented to control depth of cut including, without limitation, mechanisms having rotary and/or linear actuator portions.

The aperture 120 is defined in part by a longitudinal portion 126 of the chassis 102. The longitudinal portion 126 aids in supporting (provides support to) a vacuum manifold portion 128 that, particularly in combination with other features of the saw 100, is effective for capturing concrete dust or other detritus and conveying the same away from the saw blade 118. The vacuum manifold portion 128 will be described in additional detail below.

In the illustrated embodiment, the longitudinal portion 126 also supports a cam follower 130. The cam follower 130 serves to adjustably actuate a blade guard 132 in response to operation of the adjustment mechanism 122. One of skill in the art will appreciate that while a cam follower 130 is illustrated, a variety of other devices of various shapes and configurations could also be employed to effect the same function including, for example, a stud of metallic or polymeric material.

The apparatus of FIG. 1 includes a detachable handle 134. Detachable handle 134 is arranged and configured to allow an operator to adjust the height and tilt so as to advance the saw blade across surface region 112 of the substrate while rotation of blade 118 cuts a kerf in the substrate. As will be further discussed below, in certain embodiments, a lower end of the handle 134 is removably coupled to a rear axle supported by, for example, rear wheel 110.

Desirably, this arrangement provides operational stability and allows the operator to maintain a proper balance effecting the desirable direction and advancement of the saw blade through the substrate with a minimum of effort and from an upright walking position. In particular, the entire configuration is arranged to be relatively insensitive to minor operator errors and variations in pressure applied by the operator to the handle 134, and to maintain a particular direction of motion, so as to produce a desirably linear kerf.

In further advancement of this objective, the chassis 102 is provided with a plurality of removable counterweight portions 136, 138, 140, etc., arranged, as illustrated, in a desirable spatial relationship with respect to the saw blade 118, it's supporting arbor 116, handle 134 and a front axle (disposed between front wheels 106 and 108).

The counterweight portions serve to stabilize the chassis and assist in maintaining stability in the depth and direction of the kerf produced by the saw blade 118. The advantages of this stability, as they relate to the production of a superior linear kerf and a minimum of dust production, will be further discussed below. It should be noted that, while three individual weights are illustrated in FIG. 1, other numbers and arrangement of weights are contemplated to be within the scope of the invention. Thus, a single weight will be provided in certain applications, two, three or more than three weights of uniform or different mass will be provided.

Other notable features of the illustrated apparatus include a fixturing device 142 arranged and adapted to support an electrical power coupler 144 and a convenient lifting handle 146.

Figure 2:
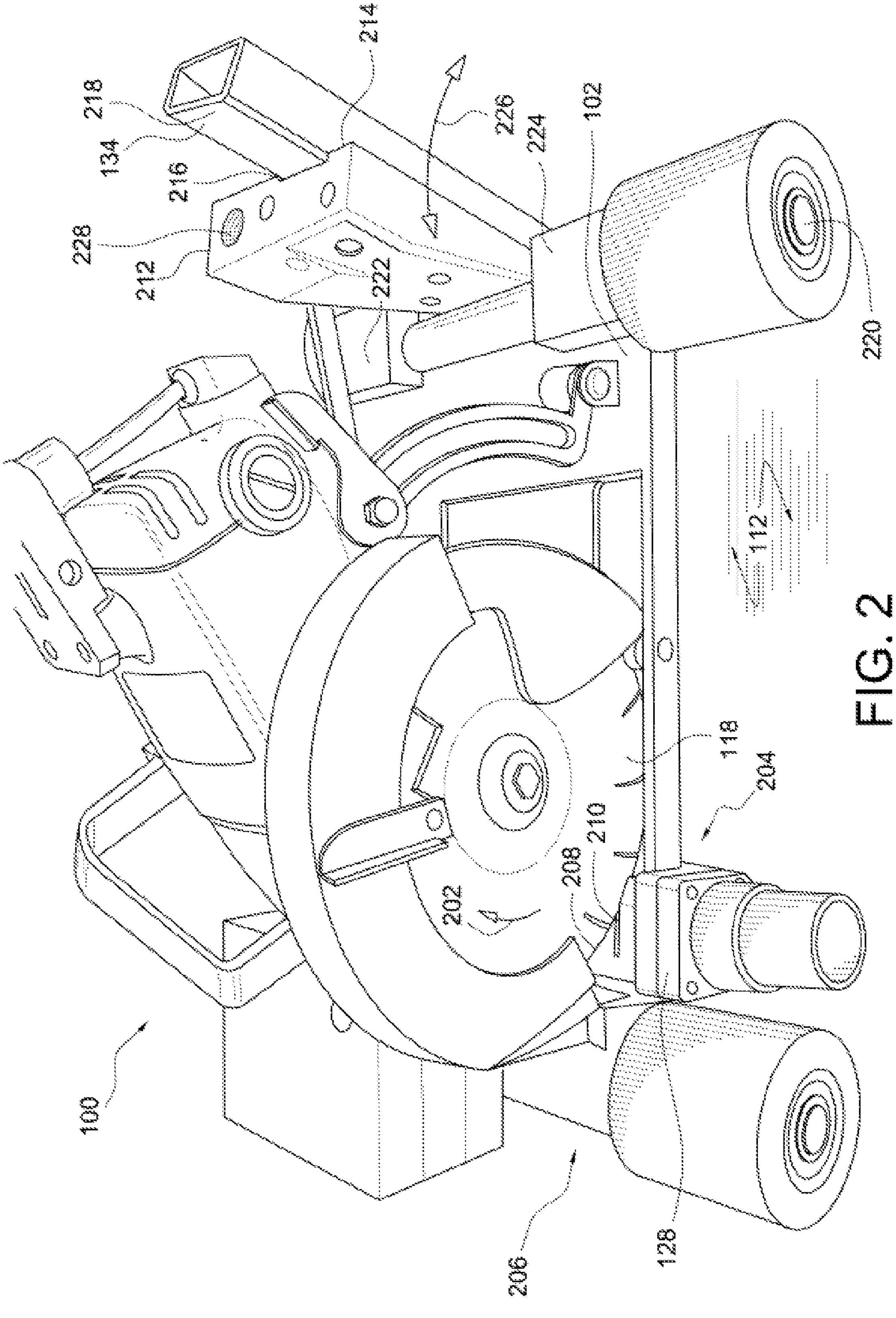
FIG. 2 shows, in schematic perspective view, further aspects of a saw according to principles of the invention.

FIG. 2 shows the concrete saw 100 of FIG. 1 in a different aspect and in additional detail. In the illustrated embodiment, saw blade 118 is arranged to contact the underlying substrate 112 at a location inwardly of all four wheels. Arrow 202 is provided to illustrate a sense of rotation of saw blade 118, i.e., clockwise in the present figure. It should be noted that, while the saw blade first enters the kerf at a trailing edge (i.e., towards the rear of the saw) the saw blade rotation first contacts the underlying substrate at a leading edge 204 towards a forward end 206 of the chassis 102. As will be discussed below in additional detail, the wheel alignment, selection of wheels, and weight distribution of the entire assembly is arranged to optimize the degree to which, in certain embodiments, the saw cuts in a straight line so that a majority of contact between the saw blade and the substrate to be cut occurs at the leading edge, 204, as noted above. Indeed, various features of the illustrated embodiment of saw 100 cooperate to maximize the degree to which cutting takes place at leading edge 204, while minimizing any skew, divergence to one side or another, or other motion that will result in contact of the saw blade 118 with other regions (i.e. rearwardly of the cutting edge along the kerf).

Consequently, the illustrated placement of vacuum manifold 128 about saw blade 118 and adjacent to leading edge 204 is optimized for the capture of particulate, dust and other detritus produced by the cutting operation. As will be discussed in additional detail below, this optimization of saw blade alignment, vacuum manifold placement and other features of the vacuum manifold and the apparatus as a whole, combine to produce a novel apparatus uniquely effective in its cutting and dust-capturing abilities.

It should be noted that an outer circumferential edge 208 of saw blade 118 passes through a slot 210 of vacuum manifold 128 as the saw blade rotates in direction 202. The features of slot 210, according to certain exemplary embodiments, are further illustrated and discussed below.

Also shown in FIG. 2 is a coupling feature 212 that serves to attach handle 134 to the chassis 102. In particular, the coupling feature 212 includes a rear surface 214 with a slot 216 sized and arranged to receive a portion of handle 134 at a lower extremity of the handle's front face 218. In addition, the coupling feature 212 includes a bore adapted to receive a portion of rear axle 220 therewithin. Because the rear axle 220 is operatively coupled to the chassis 102 by rear bearing blocks 222 and 224, this arrangement serves to strongly couple handle 134 to the balance of the saw at a central point of high leverage, optimized to minimize skewing and provide a desirable level of control. In addition, because the bore and axle are substantially cylindrical, an angular adjustability 226 is achieved with a minimum of additional components. Further details of this adjustability will be discussed below.

Finally, it should be noted that the coupling feature 212, of the illustrated embodiment, includes one or more tool receptacle cavities, e.g., 228, ideally suited for holding various adjustment tools provided in certain embodiments of the invention. While the illustrated tool receptacles are prepared as drilled holes within the coupling feature 212, one of skill in the art will appreciate that a variety of other tool holders will provide a similar benefit such as, a molded tool holder, a magnetic tool holder, and/or a spring clip tool, among others.

Figure 3:
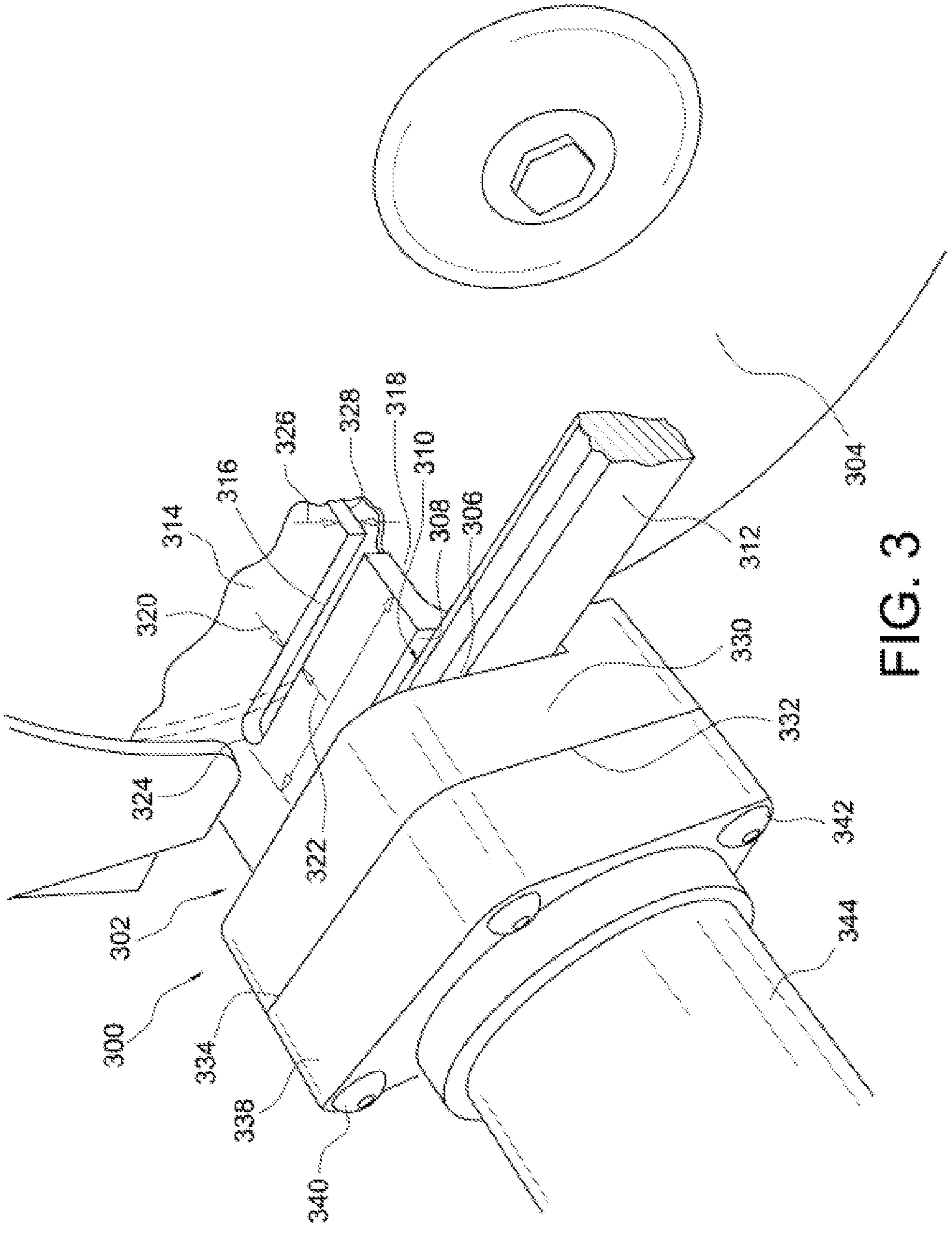
FIG. 3 shows, is cut away perspective view, a further aspect of a blade and vacuum manifold of a saw according to principles of the invention.

FIG. 3 shows, in additional detail, a portion of the vacuum manifold 300 according to one embodiment of the invention, along with the arrangement by which it interfaces with the chassis 302 and saw blade 304. In the illustrated embodiment, the vacuum manifold 300 includes first 306 and second 308 substantially planar surface regions disposed in substantially parallel space relation to one another. Surface regions 306 and 308 define a slot 310 that is sized to receive a corresponding region of a longitudinal portion 312 of the chassis 302.

An upper surface 314 of the vacuum manifold includes a further slot 316 arranged to dynamically receive a portion of the saw blade 304. Slot 316 opens into a chamber 318 that is partially divided by the saw blade 304. Slot 316 has a width 320 prepared according to the thickness of a particular blade and/or application, taking into consideration and appropriate tolerance on either side of the blade.

It will be understood that in certain embodiments, slot 316 is configured as an adjustable slot with a sliding or rotating shutter providing adjustability to accommodate blades of various thicknesses and diameters. In additional embodiments, a bristle brush feature is provided to effectively close the slot around the saw blade such that at least some of the ends of the bristles touch the blade, and occlude much of the otherwise open space around the blade, without causing undue resistance or friction. In other embodiments, a particular vacuum manifold having a slot 316 of a particular size may be exchanged with a plurality of vacuum manifolds having slots of other sizes respectively. In certain embodiments of the invention, such a plurality of manifolds is provided as a kit, with or without the saw apparatus.

Likewise, the slot has a length 322 sufficient to accommodate the saw blade when set for its deepest penetration, along with an additional tolerance sufficient to avoid accidental mechanical interference between the circumferential edge of the blade and the end 324 of the slot, while allowing proper clearance for the capture of particles of detritus.

Also indicated is a thickness 326 of an upper region of the vacuum manifold between upper surface 314 and a corresponding internal surface 328. As will be discussed below, this thickness will differ in various embodiments of the invention according to the requirements of a particular application (e.g., the substrate to be cut, the thickness of the saw blade, etc.).

A manifold flange portion 330 is arranged between surface 306 and a further generally planar surface 332. Generally planar surface 332 is configured to be placed adjacent to a corresponding generally planar surface 334 of a hose coupling flange portion 338. In the illustrated example, threaded fasteners, e.g., 340, 342 are provided to securely couple surface 334 of the hose coupling flange in intimate contact with surface to surface 332 of the vacuum manifold flange. In addition, in certain embodiments, further holes and fasteners, not shown here, are provided for coupling the vacuum manifold assembly 300 through the longitudinal member 312 of chassis 302 to (and, in certain embodiments, into) generally planar surface 308.

As will be further described below, the hose coupling flange 338 supports a generally cylindrical hose coupling tube 344. The hose coupling to 344 has an outside diameter sized to be received within a corresponding inside diameter of, for example a vacuum hose. One of skill in the art will appreciate that, beyond the here-described male/female coupling, other coupling arrangements between hoses and vacuum manifolds are contemplated within the scope of the invention.

Figure 4:
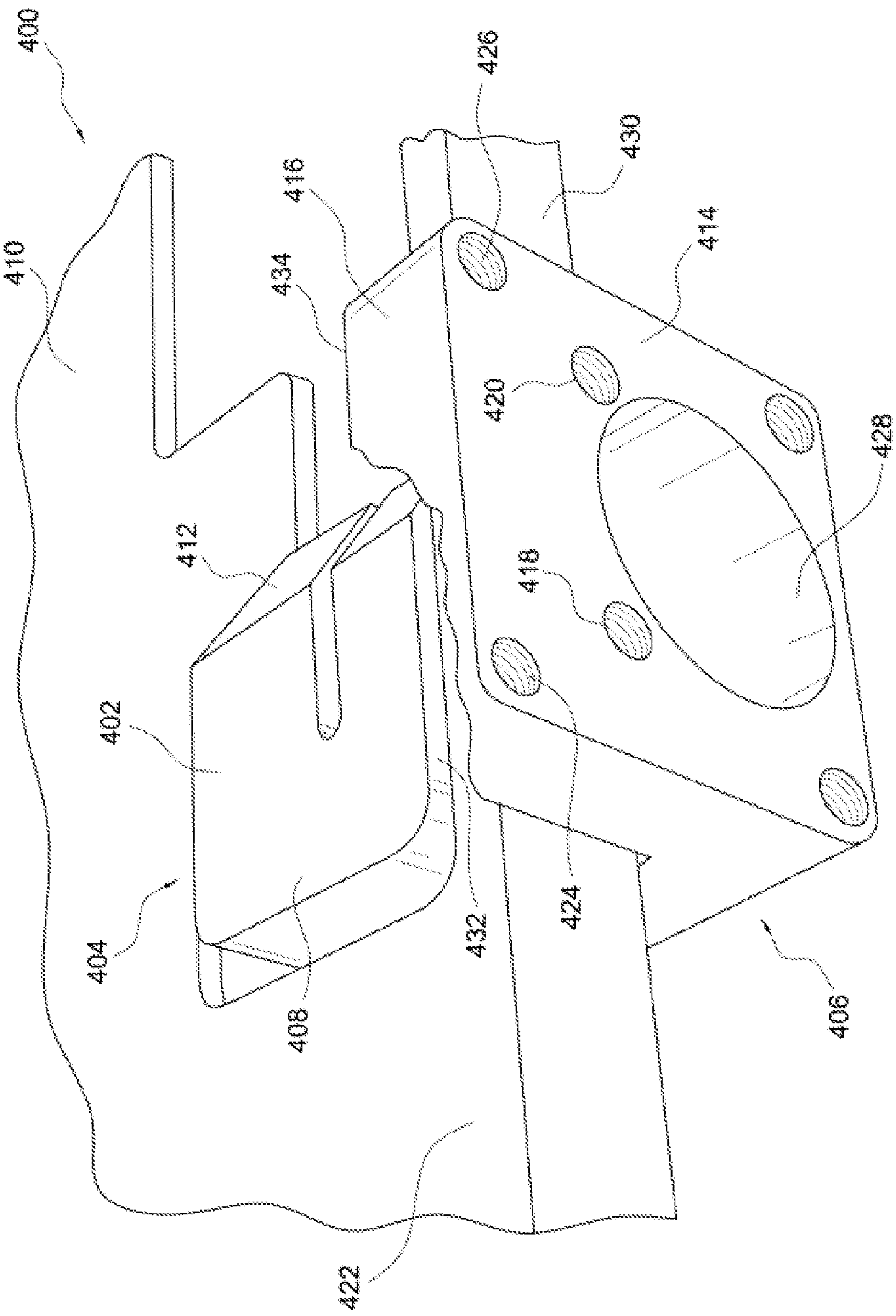
FIG. 4 shows, encode away perspective view, further aspects of a vacuum manifold for a saw according to principles of the invention.

FIG. 4 shows an oblique dorsal perspective view of a further embodiment of the invention, showing an alternative configuration of a vacuum manifold 400. In this embodiment, upper surface 402 of the blade box portion 404 of the vacuum manifold 406 includes a first portion 408 disposed generally parallel to upper surface 410 of the chassis, and a second portion 412 disposed at an oblique angle with respect to surface 410. In comparison to the vacuum manifold 300 of FIG. 3, vacuum manifold 400 has a relatively thick region between surface region 402 and the underlying cavity. This relative thickness accommodates an additional curvature of the corresponding internal surface, as will be further illustrated and discussed below.

Also shown in FIG. 4 is a clear view of the mating surface 414 of the blade box flange 416. Holes 418 and 420 are visible. Holes 418 and 420 are sized and arranged to accommodate the threaded fasteners that, in the illustrated embodiment, serve to, or aid in, substantially fixedly coupling the vacuum manifold 400 to the chassis 422.

In certain embodiments, the holes 418 and 420 are countersunk, counter-bored, or otherwise recessed to receive the heads of respective cap screws, for example. In some embodiments, the cap screws pass through un-threaded holes in the longitudinal member portion 430 of chassis 422 and threadingly engage with further internally threaded holes in surface 432 on the first portion of the manifold 408.

Consequently, when the cap screws are tightened, internal surface 434 of blade box flange 416 is drawn towards surface 432 so as to capture and frictionally engage corresponding surface regions of longitudinal member 430. Also shown are the holes, e.g., 424, 426 provided to receive the threaded fasteners that, in the illustrated embodiment, couple the blade box flange to the vacuum hose coupling flange (e.g., FIG. 3, elements 338). According to certain embodiments of the invention, internal surfaces of these holes 424, 426, are provided with internal helical threads for coupling to externally threaded fasteners.

Finally, in this view, a generally cylindrical internal surface 428, defining a longitudinal passage through the vacuum box flange is visible. It should be understood that the configuration of this internal surface will differ according to the requirements of a particular application and that while the illustrated passage is generally circularly cylindrical, other passages will embody a variety of different geometries including, without limitation, triangular, rectangular, pentagonal, hexagonal, heptagonal, octagonal, elliptical, irregular, etc.

Figure 5:
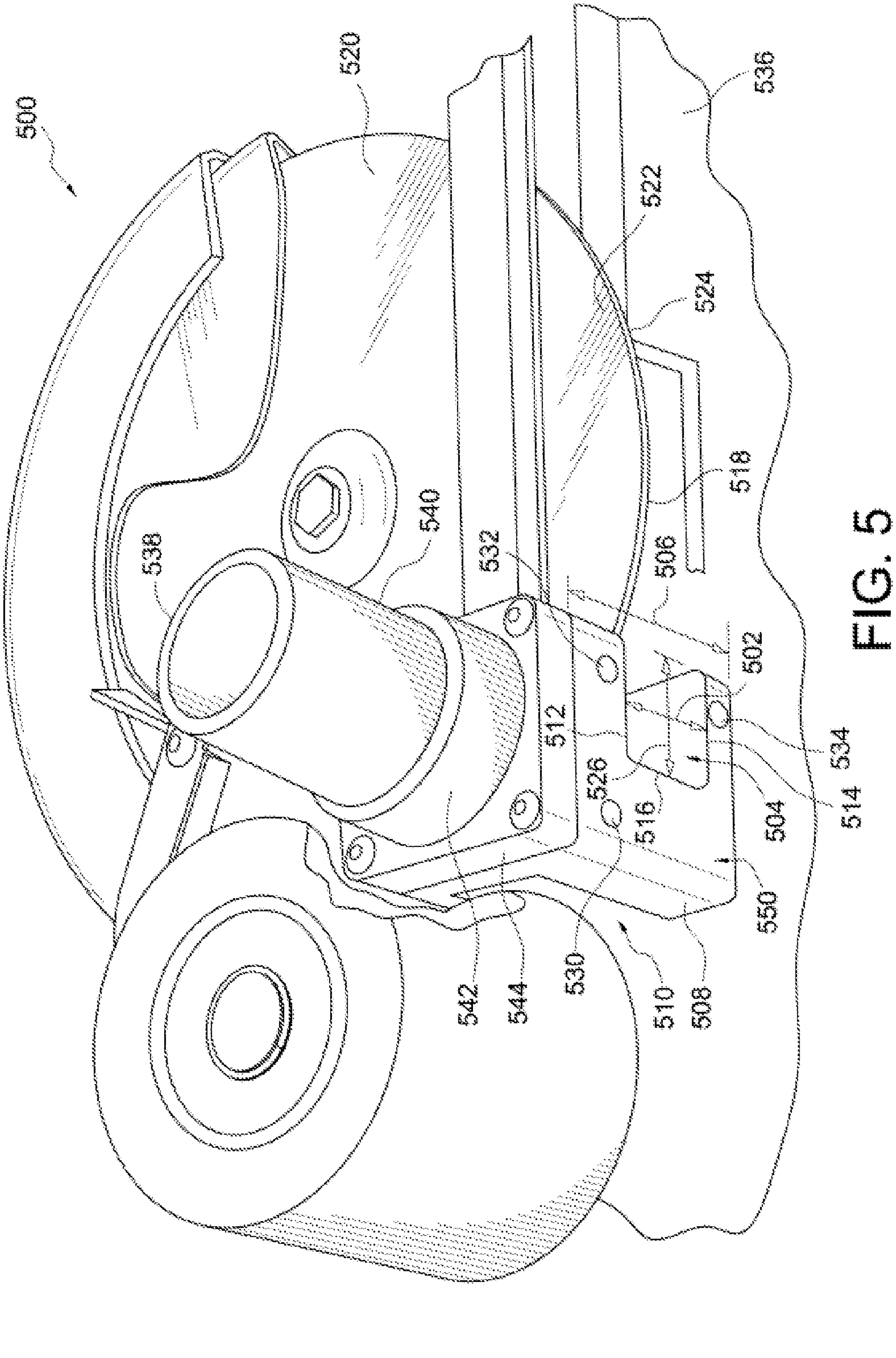
FIG. 5 shows, in ventral cutaway view, further aspects of a saw according to principles of the invention.

FIG. 5 shows, in an oblique, generally ventral view, further aspects of a saw 500 according to principles of the invention. In particular, in certain embodiments, a lateral linear dimension 502 of a lower aperture 504 is a substantial fraction of an overall width 506 of the blade box portion 508 of the vacuum manifold 510. It should be understood that, in other embodiments, linear dimension 502 may be substantially equal to overall with 506, and in still other embodiments, linear dimension 502 may be a small fraction of overall with 506. Accordingly, the ratio between linear dimension 502 and overall width 506 will have any value over a large range according to requirements of a particular application.

It should also be understood that while edges 512, 514 and 516 are shown as substantially linear, in other embodiments, one or more of these edges will be curved, crenellated, scalloped, or otherwise configured according to the requirements of a particular application. Further, in certain applications, two or more of edges 512, 514 and 516 will be configured as a single more or less smooth curve. More generally the edges defining aperture 504 will correspond to at least a portion of any one of a circle, an ellipse, a regular polygon, an irregular polygon, a regular curve, an irregular curve, and combinations thereof.

In the illustrated embodiment, aperture 504 is defined by a proximal edge 512, a distal edge 514 and a lateral edge 516. The location of the saw within this aperture will depend on the configuration of a particular application of the invention. Thus, for example, in one preferred embodiment, the circumferential surface 518 of blade 520 is disposed with a distance between surface 522 of blade 520 and proximal edge 512 such that this distance is approximately one half as far as the corresponding distance between the opposite surface 524 of blade 520 and distal edge 514. In other words, the blade 520 is disposed about two thirds of the way across the aperture from the distal edge 514 to the proximal edge 512. This configuration is referred to by the present inventors as a blade location ratio of two thirds, or 66%.

The blade location ratio will be chosen to have any variety of values according to the requirements of a particular application and according to factors such as the type and dimensions of the blade to be employed. Thus, in an alternative embodiment, the circumferential surface 518 of blade 520 is disposed such that a distance between surface 522 of blade 520 and proximal edge 512 is approximately one third as far as the corresponding distance between the opposite surface 524 of blade 520 and distal edge 514. In other words, the blade 520 is disposed about three quarters of the way across the aperture from the distal edge 514 to the proximal edge 512. This configuration is referred to as a blade location ratio of three quarters, or 75%. It should be understood that these blade location ratios are merely exemplary and that, in various embodiments, it will be desirable to provide a vacuum manifold device having a blade location ratio within the range from at least about 20% to at least about 80% corresponding to alternative uses of the saw and alternative materials and conditions of the substrate to be cut.

Of similar importance, the overall width 502 of aperture 504 and the corresponding overall length 526 have particular values selected according to the requirements of a specific embodiment and application of the saw. Moreover, the ratio between width 502 and length 526 will be, in various embodiments of the invention, between at least about 20% and at least about 500%. This ratio is referred to by the inventors as the "aperture ratio." In certain embodiments, the aperture ratio will be in a range between at least about 50% and at least about 200%.

It will also be understood that the wheels and chassis are arranged, in conjunction with dimensions of the vacuum manifold, to result in an assembly that maintains a lower surface region 550 of the blade box portion of the vacuum manifold at a finite distance (referred to by the inventors as manifold clearance) above a corresponding surface region of an underlying substrate. That is to say that lower surface region 550 is disposed and maintained in substantially parallel spaced relation with respect to an underlying surface region of a substrate to be cut.

In various embodiments, manifold clearance is adjustable by a variable mechanism arranged to displace the manifold with respect to the chassis. In other embodiments, manifold clearance is adjustable by exchanging one manifold for another. In still further embodiments, manifold clearance is adjustable by a variable mechanism arranged to displace the entire chassis with respect to the underlying substrate, e.g., by displacing one or both axles with respect to the chassis. In various embodiments, manifold clearance is adjustable within a range from 0 (i.e., in contact with the underlying substrate) to at least about 1 inch. In certain embodiments, manifold clearance will be adjustable from a range of about 0.20 inches above the underlying substrate to at least about 0.50 inches above the underlying substrate.

The present figure also shows, in some detail, additional holes, 530, 532 and 534 through the lower surface 550 of the blade box portion. Holes 530, 532 and 534 are provided to accommodate fasteners, such as, for example, threaded fasteners, which serve to further reinforce the attachment of the vacuum manifold 510 to the chassis 536. Of course it will be understood that these fasteners are merely exemplary of a wide variety of fastening technologies which may be applied to fixedly and permanently or removably couple the vacuum manifold 510 to the chassis 536.

FIG. 5 also shows, in additional detail, the generally circular cylindrical configuration of the coupling tube 538 of the hose-coupling portion 540 of the vacuum manifold 510. In particular, it should be noted that, in certain embodiments, a reinforced base portion 542 of the coupling tube 538 as a greater wall thickness than the balance of the coupling tube so as to provide a durable connection between the coupling tube 538 and its respective flange 544.

Figure 6:
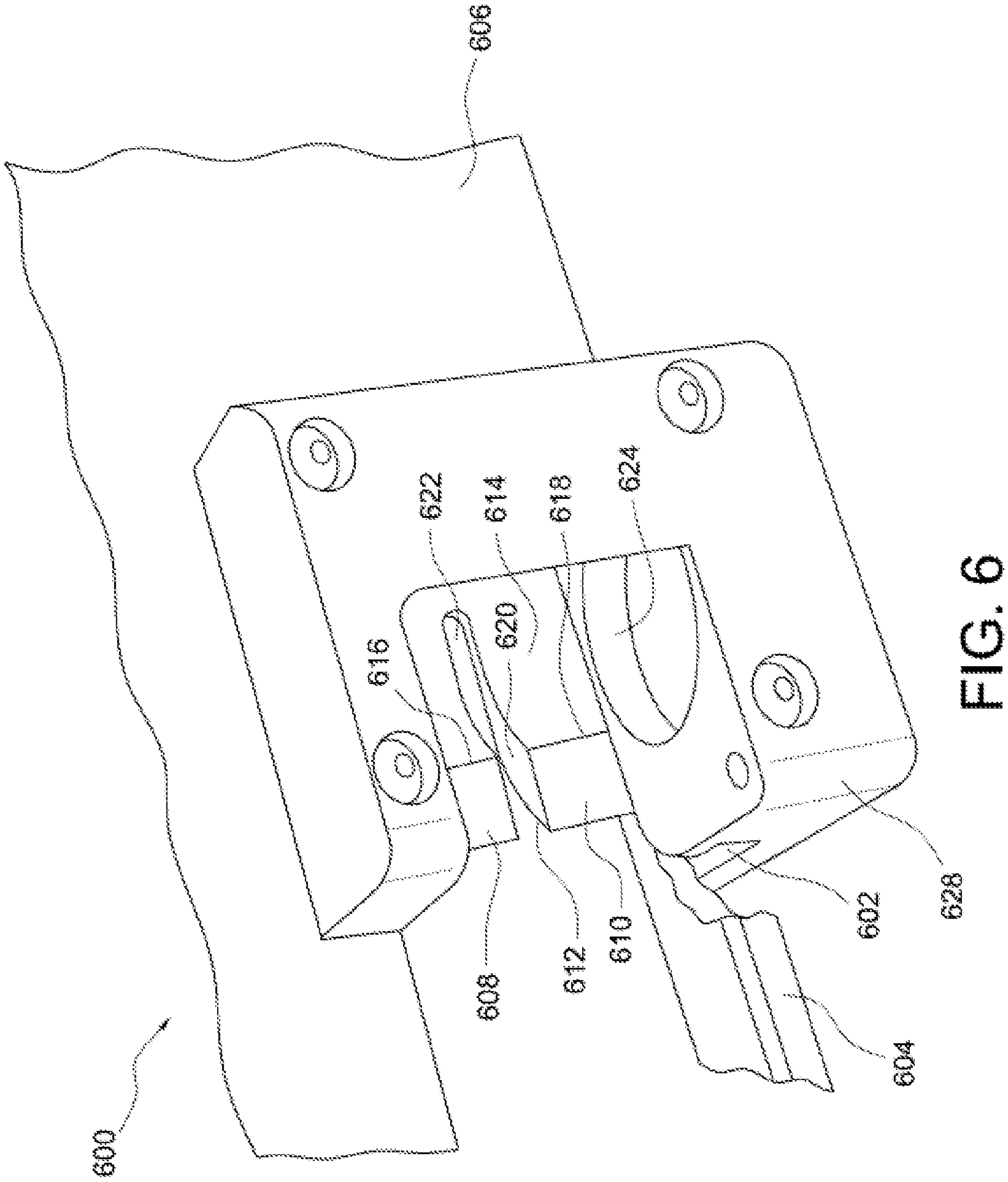
FIG. 6 shows, in ventral perspective view, further features of a saw according to principles of the invention.

FIG. 6 shows a further ventral perspective view of a blade box portion 600 of a vacuum manifold for a saw such as saw 100 of FIG. 1. This view offers further detail of slot 602 and its engagement with longitudinal member 604 (shown cutaway) of chassis 606. Also illustrated are first 608 and second 610 lower surface regions disposed in oblique spaced relation to a second portion 612 of the corresponding upper surface region (shown more clearly as element 412 on FIG. 4). Surface region 608 and 610 are shown as being substantially planar in the illustrated embodiment. Each, however, adjoins a curved internal surface region 614 at respective edges 616, 618. Also visible is an internal surface region 620 defining, in part, blade slot 622.

In the illustrated embodiment, curved internal surface 614 defines a portion of a substantially circular cylindrical surface. One of skill in the art will appreciate, however, that a wide variety of other geometries are possible and desirable according to the requirements of a particular embodiment of the invention. Accordingly, internal surface 614 will, in respective embodiments, define a portion of a generally elliptical cylindrical surface, a portion of a generally triangular cylindrical surface, a portion of a generally rectangular cylindrical surface, or a portion of a higher order polygonal cylindrical surface. In addition, while the foregoing examples correspond to cylinders of projection, other forms for the internal surface 614 are also contemplated including, for example, an ellipsoidal surface and a spherical surface, among others.

Finally, it should be noted that the present illustration offers a clear view of an internal surface 624 defining, in this case, a generally circular cylindrical passage through blade box flange 628. As will be further illustrated below, this generally circular cylindrical passage is adapted to join a further circular cylindrical passage within the hose coupling portion of a vacuum manifold for a corresponding embodiment.

Figure 7:
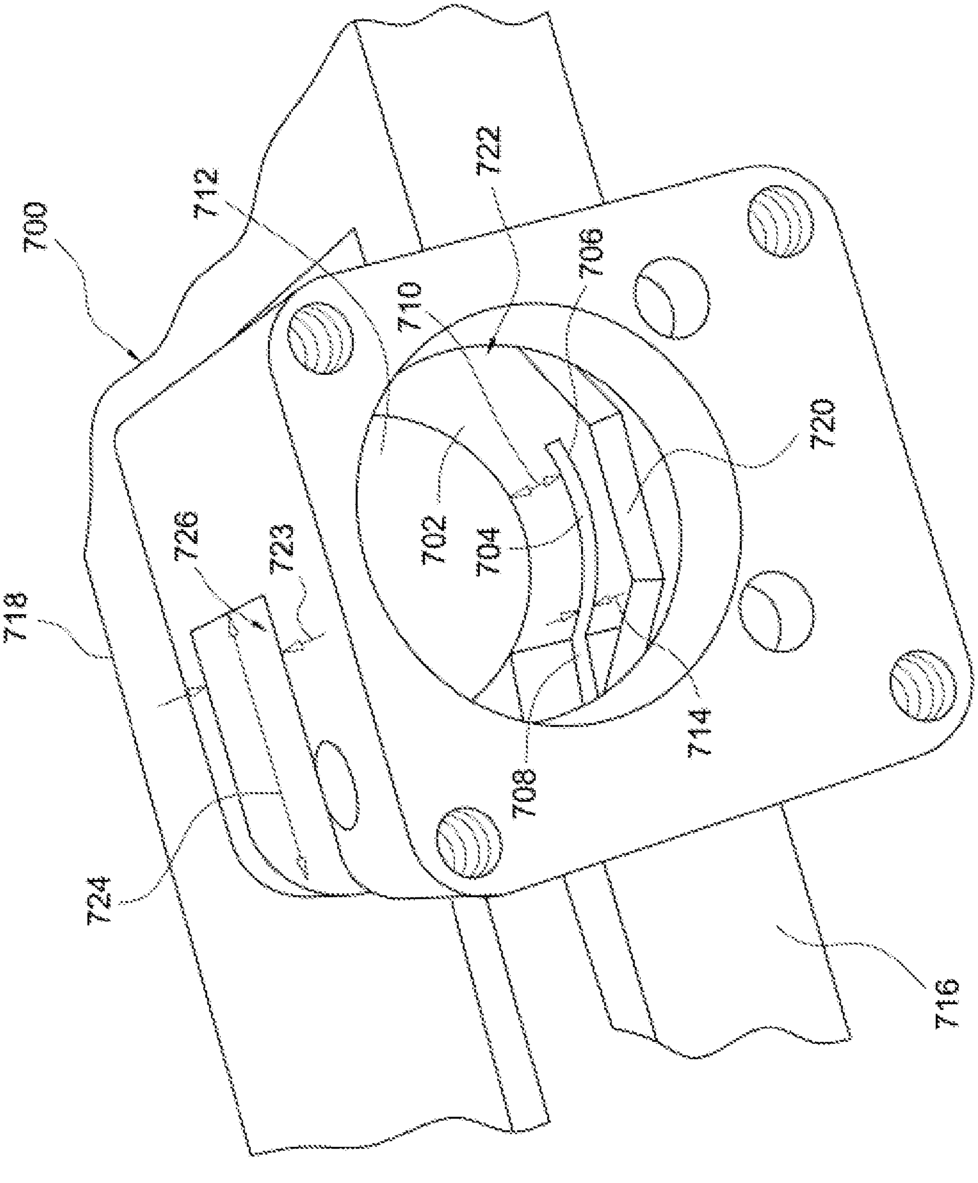
FIG. 7 shows, in schematic perspective view, certain further aspects of a saw according to principles of the invention.

FIG. 7 shows, in schematic perspective view, a further aspect of a blade box portion 700 of a vacuum manifold for a saw according to principles of the invention. In particular, the generally circular cylindrical form of internal surface 702 is visible along with the resulting curved edges 704, 706 of blade slot 708. As noted above, the relative proximity 710 of blade slot 708 to internal end surface 710 will be chosen and prepared according to the requirements of a particular application. Likewise, the width 714 of blade slot 708 will be determined according to the dimensions of a blade to be employed and the requisite tolerance outwardly of the blade necessary to accommodate deviations in blade flatness and any particulates likely to become lodged in the slot.

In the illustrated embodiment, a portion of longitudinal member 716 of chassis 718 is visible at 720, and forms a partial obstruction of passage 722 defined, in part, by internal surface 702. In other embodiments, however, this partial obstruction is minimized or eliminated. Again, the transverse 723 and longitudinal 724 dimensions of aperture 726 are identified.

Without meaning to be bound to a particular theory of operation, the inventors note that depending on aperture size and aperture ratio, saw blade angular velocity and manifold absolute and differential pressure, as compared to local atmospheric pressure, the passage of air in through aperture 726 past the spinning saw blade and out through passage 722 tends to induce a desirable pattern of air flow. According to certain embodiments of the invention, this air flow includes airflow distributed in one or more vortices, that are well suited to elevate and convey dust, particulate matter and other detritus away from a leading-edge of the saw/substrate interface and out through passage 722.

In particular, in certain embodiments, the passage of the edges of the discrete saw teeth found on some saw blades through the lateral flow of air across the saw blade caused by the applied vacuum will induce individual vortices on either side of the saw teeth. Where the dimensions and arrangement of the vacuum manifold are properly configured, these vortices will be shed from the saw teeth into the overall flow of air into the vacuum hose. Correspondingly, dust and particulate matter will become trapped by the individual vortices and subsequently shed into the lateral air flow so as to provide the effective removal of dust from both sides of an operating blade in a way that is surprisingly effective, and in no way matched by any previously available technology. Consequently, this residual material will be effectively and advantageously collected at, for example, a filtering vacuum system remote from the saw blade.

In addition, with reference to FIGS. 8A and 8B, which are described below, angles 816, 854 and 856 will result in additional desirable flow characteristics within the vacuum manifold and within any attached hose. In particular, in certain embodiments, a properly selected value of the indicated angles will result in additional vortices within the hose. These flow characteristics will further serve to support airborne particulate matter and dust as it is removed from the vicinity of the saw and transported to a vacuum apparatus.

Depending on particular parameters of operation, the form of fluid flow produced may include any of a Lamb-Oseen form vortex, a tornadic form vortex, a spheroidal form vortex, a Tollmien-Schlichting form vortex, a Blasius form vortex, a Navier-Stokes form vortex, a Chorin form vortex, as well as any other turbulent or laminar flow pattern, and combinations thereof. Once having the benefit of the present disclosure, one of skill in the art will appreciate that particular configurations of vacuum manifold and applied pressure differentials will produce desirable results and, therefore, all of the indicated fluid flows described above, and others that may be discovered and applied in the present context, are considered to be within the scope of the invention.

It is contemplated that in certain embodiments, blade angular velocity and airflow velocity through passage 722 will operate open loop and, accordingly, may vary in absolute terms and with respect to one another during operation of the saw. In other embodiments, mechanical and/or pneumatic and/or electrical and/or electronic controls will be applied to regulate the absolute and relative values of blade angular velocity and air velocity.

Figure 8A:
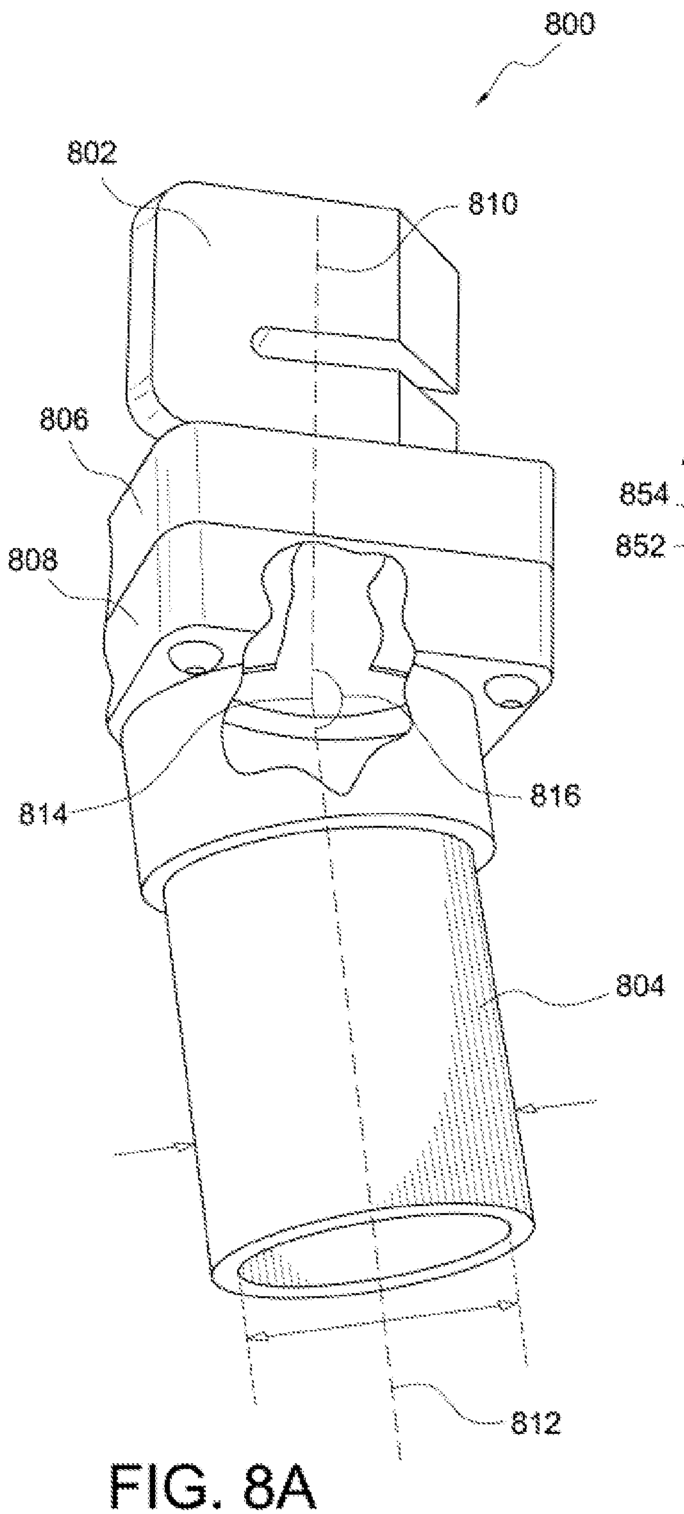
FIG. 8A shows, in cutaway perspective view, certain further features of a vacuum manifold for a saw according to principles of the invention.

FIG. 8A shows, in partial cutaway perspective view, a further aspect of a vacuum manifold 800 according to principles of the invention. The vacuum manifold 800 includes a blade box portion 802 and a hose coupling portion 804. The blade box portion 802 and hose coupling portion 804 are mutually coupled at respective flanges 806 and 808. A generally circular cylindrical internal surface of the blade box portion defines a cylindrical cavity therewithin and a first longitudinal axis 810. The hose coupling portion 804 has a further generally circular cylindrical internal surface defining a cylindrical cavity and a second longitudinal axis 812. According to certain embodiments of the invention, first longitudinal axis 810 and second longitudinal axis 812 intersect at a vertex 814.

An intersection of axes 810 and 812 at vertex 814 defines a passage angle 816. In various embodiments of the invention, passage angle 816 will have a value within the range between at least about 0° and at least about 90'. In other embodiments, passage angle 816 will have a range between at least about 0° and at least about 20°. In still further embodiments, passage angle 816 will have a range between at least about 30° and at least about 60°.

It should be understood that longitudinal axes 810 and 812 are not necessarily pure centroid axes of the corresponding cavities. While in some embodiments these axes will be pure centroids, in others they will be only approximate, and any intersection of these axes may also be approximate. That is, they may not actually intersect but only approximately intersect, such that the passage within the blade box portion 802 and the passage within the hose coupling portion 804 are arranged generally at the above-indicated passage angle with respect to one another. It will also be understood that in certain embodiments, axes 810 and 812 are not strictly linear but one or both will incorporate a curve of any form appropriate to the requirements of a particular application.

Axes 810 and 812 further define a passage plane such that both axes 810, 812 and vertex 814 are disposed in the passage plane. In operation, passage plane 816 is disposed at an oblique angle with respect to a plane corresponding to an upper surface of the underlying substrate (referred to by the inventors as the ground plane).

Figure 8B:
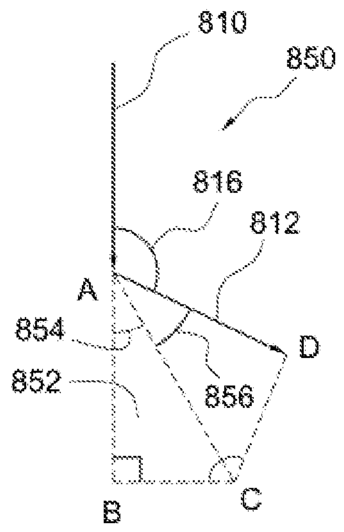
FIG. 8B shows, in geometric schematic form, the geometric arrangement and relationships of an exemplary vacuum manifold for a saw according to principles of the invention.

This relationship is further illuminated by FIG. 8B. FIG. 8B shows, in schematic perspective view, the geometry 850 of the first 810 and second 812 axes of FIG. 8A. In certain embodiments, axis 810 is disposed substantially normal to a plane defined by an outward surface of the saw blade.

As shown, triangle ABC defines a first plane 852. During operation of the saw, plane 852 is disposed in generally parallel spaced relation to a plane defined by an average local surface of the underlying substrate—the ground plane. Angle 854 is defined azimuthally towards the rear of the saw (i.e. in a negative direction) and indicates a first component of angle 816 in three space.

Angle 856 indicates an elevation of longitudinal axis 812 (i.e. upwardly away from the underlying substrate, and indicates a second component of angle 816 in three space. One with adequate mathematical background will appreciate that angles 854 and 856 may be treated as vector arguments and added vectorially to produce angle 816.

In light of the foregoing, the practitioner of skill in the art will appreciate that various apparatus will be constructed, all within the scope of the present invention, in which angle 854 will fall anywhere within a range from at least about 0° to at least about 90°. In like fashion, angle 856 will, in various embodiments, fall anywhere within a range from at least about 0° to at least about 90°.

In certain embodiments, angle 854 will be prepared within a range from at least about 0° to at least about 10° and angle 856 will be provided within a range from at least about 0° to at least about 10° so as to desirably support a proximal end of a vacuum hose while optimizing the resulting forces. In certain embodiments, angle 854 will be prepared to have a value of 7.11 back and angle 856 will be prepared to have angle of 7.11° up. In certain embodiments of the invention, angle 816 will be prepared to have a value of approximately 7°. In other embodiments, angle 816 will be prepared to have a value of approximately 7.07°.

This optimization will be performed according to the requirements of a particular application in order to control the degree to which a resulting weight and drag of the vacuum hose tends to impress a deviation on a direction of the saw away from the production of a substantially linear kerf. As discussed above, the weights, shown for example as 136, 138 and 140 in FIG. 1, will be selected according to the drag resulting from a particular combination of angles 854, 856 in combination with the weight and other characteristics of the hose and other apparatus employed. Thus, for a particular application, more or fewer weights will be added to the saw according to the angles 854, 856 and hose applied, so that the saw will readily follow a straight line.

For one exemplary freestanding vacuum dust collector apparatus having a standard 2½ inch hose, with a longitudinal length in a range from at least about 10 feet to at least about 100 feet, depending on the weight, materials, construction, diameter and wall-thickness of the hose, angle 816 will be prepared within a range from at least about 6° to at least about 8°. In one embodiment, angle 816 will be prepared to have an angle of approximately 7.1°.

Figure 9:
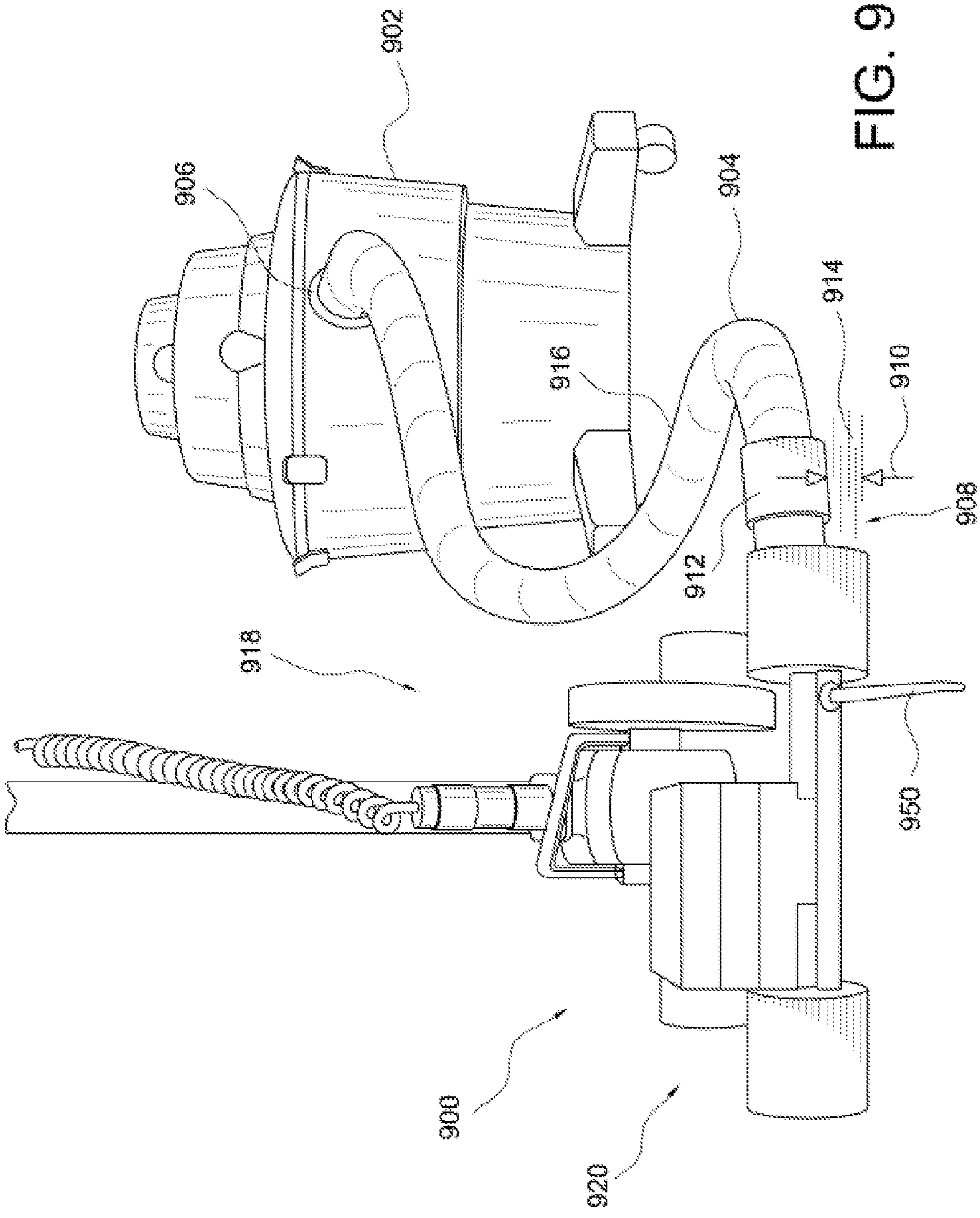
FIG. 9 shows, in schematic perspective view, additional features and modes of operation of a saw and vacuum according to principles of the invention.

One of skill in the art will appreciate that the linear weight, materials and supporting arrangement of the vacuum hose will affect the selection of angles 854 and 856. For example, FIG. 9 shows, in schematic perspective view, a portion of one embodiment of a saw 900 and vacuum dust collector assembly 902 according to principles of the invention. Hose 904 is coupled at a distal end thereof to a vacuum inlet 906 of the vacuum dust collector 902 and, at a proximal end, to an outlet 908 of the vacuum manifold described above. As illustrated, the vacuum coupling portion is prepared with an angle of elevation (see 856, FIG. 8B) effective to maintain a desirable spacing 910 between an external surface 912 of a proximal end of the vacuum hose and an adjacent region 914 of the underlying substrate. Consequently, to the extent that an external surface of the vacuum hose touches the underlying substrate, most often, this contact takes place at an intermediate region 916 between the proximal and distal ends of the vacuum hose. As a result, this contact experiences friction consistent with a weight of a local region of the hose, and is substantially independent of a weight of the saw 900.

Because any drag conveyed by the hose to the saw is applied to one side 918 of the saw and not the other 920, reducing or eliminating hose drag reduces a tendency of the saw to diverge from a straight path during operation.

In light of the present disclosure, one of skill in the art will recognize that other arrangements and configurations will also be possible. For example, a backpack-mounted vacuum apparatus will be included in one combination apparatus according to principles of the invention. In a further embodiment, an automated mobile device will support a vacuum apparatus and automatically maintain an appropriate range to the saw so as to optimize a degree of hose drag experienced by the saw during operation.

Figure 10:
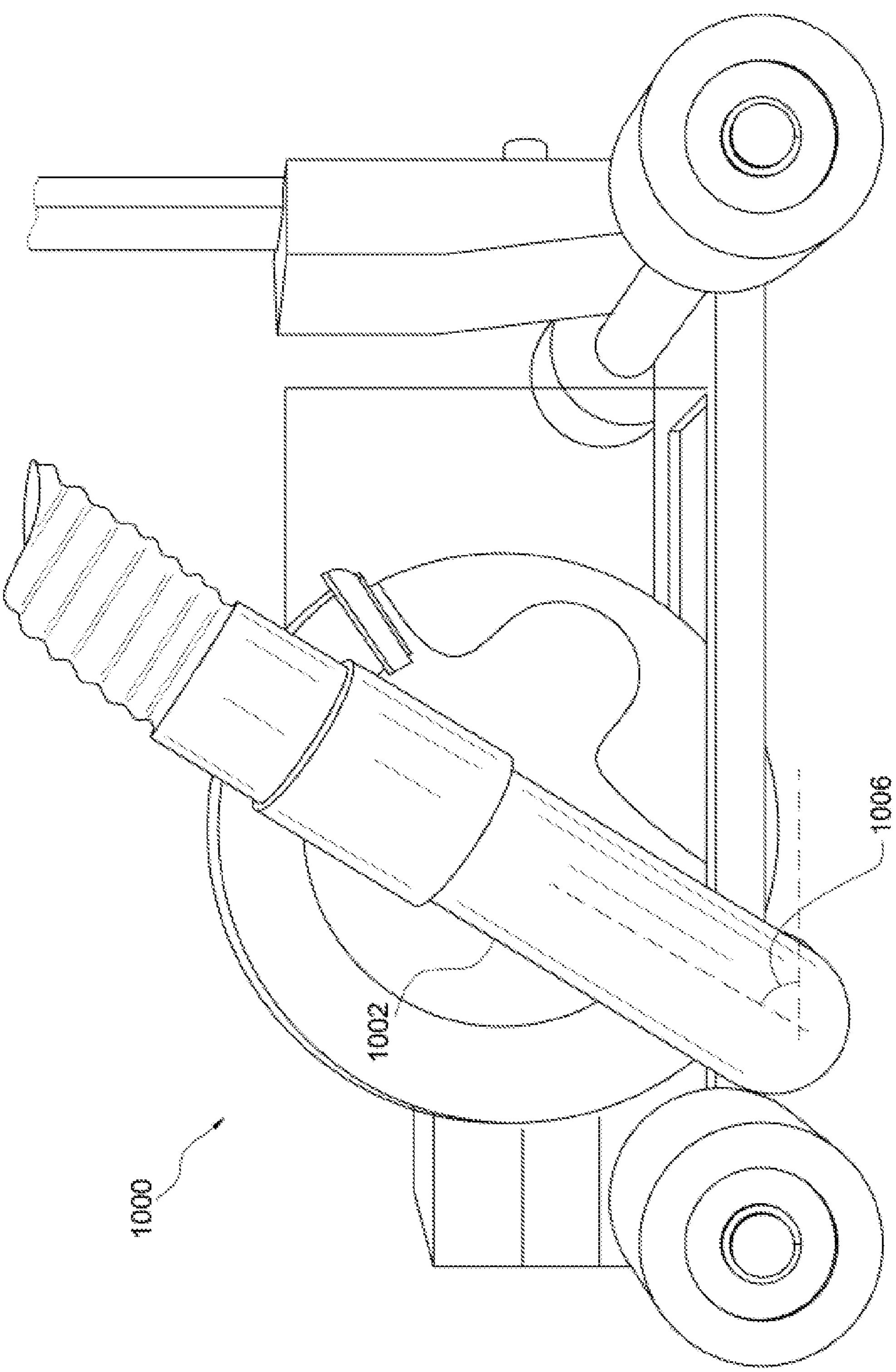
FIG. 10 shows, in perspective view, further details of a saw prepared according to principles of the invention.

FIG. 10 shows a further concrete saw 1000 prepared according to principles of the invention. Saw 1000 includes a vacuum manifold 1002 configured differently from that of saw 900 discussed above. In particular, vacuum manifold 1002 includes a vacuum coupling portion 1004 having an azamuthal angle substantially equal to 90° and an elevation angle 1006 having a value in a range between at least about 5° and at least about 90°.

Referring again to FIG. 1, one notes that fixturing device 142 is provided to support electrical coupling device 144. This aspect of the invention is shown in additional detail in 11A and 11B. As illustrated, the fixturing device 142 has a proximal end 1102 arranged to support the electrical coupling device 144 and a distal end 1104 for coupling to the balance of the saw assembly 1106. In the illustrated device, the distal end includes first 1108 and second 1110 threaded fasteners arranged to substantially fixedly couple the fixturing device 142 to a pillar or projection 112 extending upwardly of the saw assembly 1106. One of skill in the art will appreciate, however, that a wide variety of other fixturing methods, means an apparatus will be used in various embodiments of the invention according to the demands of a particular application.

The illustrated embodiment includes an aperture 1114 through the body of the fixturing device 142 defined by, in the illustrated case, a substantially circular cylindrical internal surface region 1116. It should be noted that, while the illustrated internal surface region 1116 is circularly cylindrical, a wide variety of other alternatives are possible including triangular, rectangular (including square), pentagonal, hexagonal, and any other regular or irregular shape appropriate to hold a particular electrical coupling device.

Figure 11B:
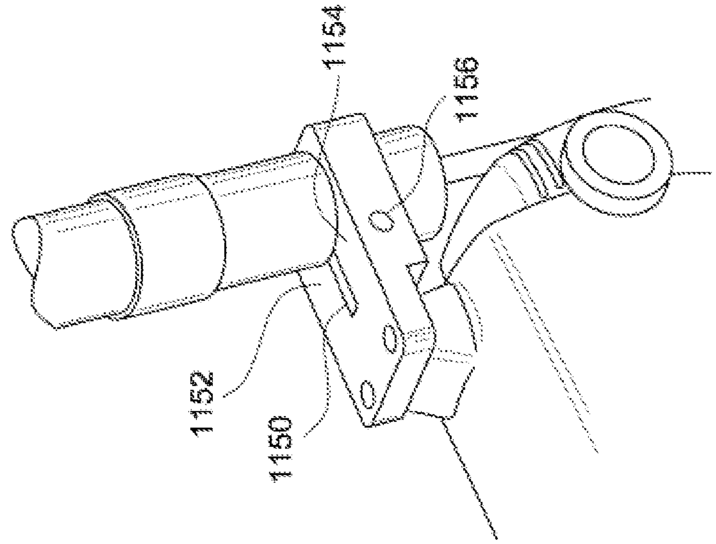
FIGS. 11*a* and 11*b* show further details and aspects of a saw prepared according to principles of the invention.
Figure 11A:
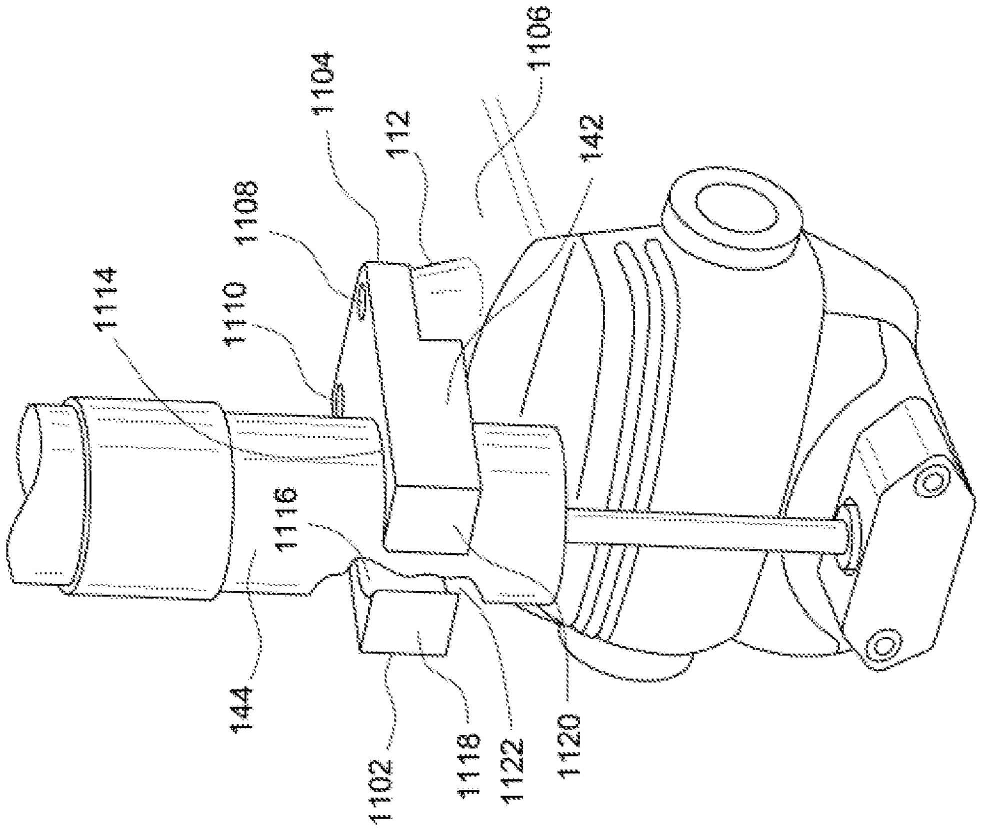

As apparent from FIG. 11A internal surface 1116 meets external proximal surface regions 1118, 1120 at a further aperture or opening 1122. Referring now to FIG. 11B, one sees that a slot 1150 intercepts internal surface 1116 at a distal side thereof. Slot 1150 cooperates with aperture 1122 to relieve first 1152 and second 1154 sides of the fixturing device 142 so that the sides can be deformed inwardly.

For example, in the illustrated embodiment, a threaded fastener (such as a cap screw, machine screw or bolt) 1156 is tightened to deform size 1152 at 1154 inwardly. As a result, respective portions of internal surface region 1116 frictionally engage with a corresponding outer surface region of electrical coupler 144 to secure the electrical coupler in substantially fixed relation to the fixturing device 142. Again, one of skill in the art will appreciate that other clamping mechanisms and devices, such as are known or may become known in the art, may be applied in combination with the balance of the saw assembly as described above to form the new and improved apparatus described here with.

Figure 12:
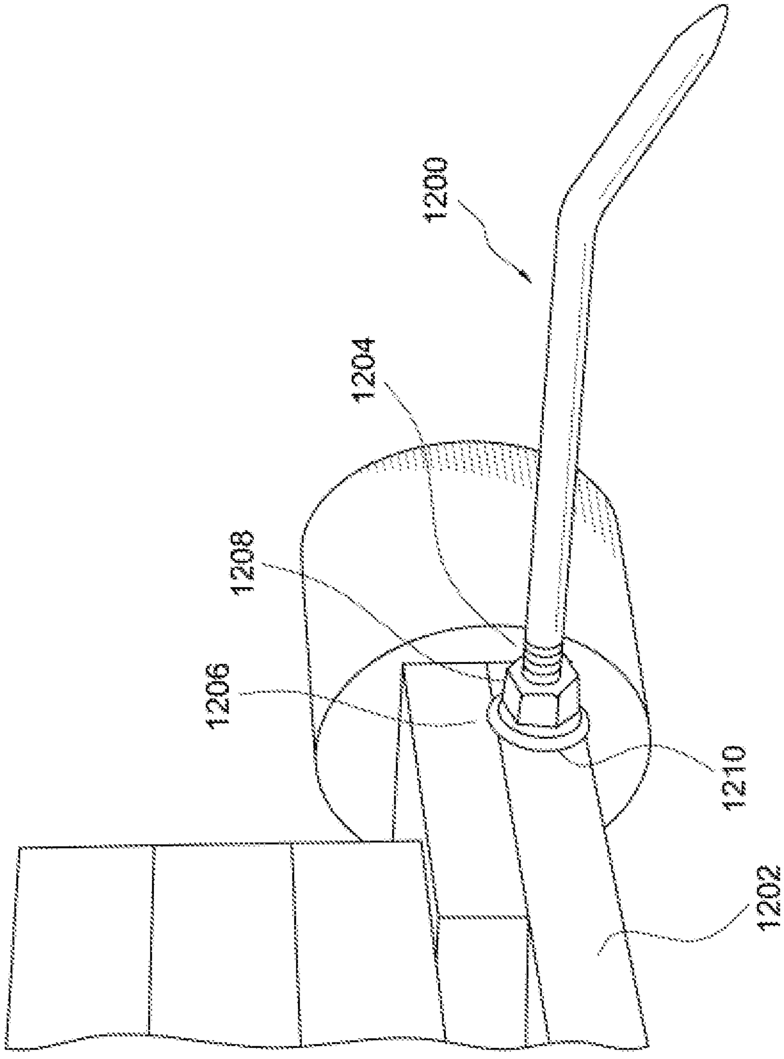
FIG. 12 shows stills further features of a saw prepared according to principles of the invention.

FIG. 12 shows a further aspect of the invention including an alignment pointer 1200. The alignment pointer 1200 is adjustably coupled to a chassis 1202 of a saw according to principles of the invention. In the instant figure, this coupling is made by providing an internally threaded hole in the chassis adapted to receive an externally threaded proximal end 1204 of the pointer 1200. A washer 1206 and locknut 1208 are tightened against a forward surface region 1210 of the chassis 1202 to minimize the possibility that vibration resulting from operation of the saw will loosen and displace the pointer 1200. One of skill in the art will appreciate that other arrangements for fastening a pointer to the chassis are possible and that alternatives to the pointer include, for example, a laser or focused light.

A further view of the pointer is available in FIG. 9 where the pointer is identified by element numeral 950. It should be noted that the pointer is adjustable both in length and in rotation. Rotation of the pointer offsets its point laterally only across the front of the chassis and consequently allows the pointer to be adjusted so as to conform its pointing direction the requirements of a particular saw blade and/or saw blade offset.

One of skill in the art will appreciate that while using the saw, an operator will sight past a point of the pointer to, for example, a chalk line placed in advance on an upper surface of the substrate to be cut. By maintaining the point of the pointer aligned with the chalk line, the operator is able to maintain a straight cut across the substrate. Of course, one of skill in the art will understand that alternative means of directing the saw are possible including, for example, providing an apparent line on the substrate using a laser.

Figure 13:
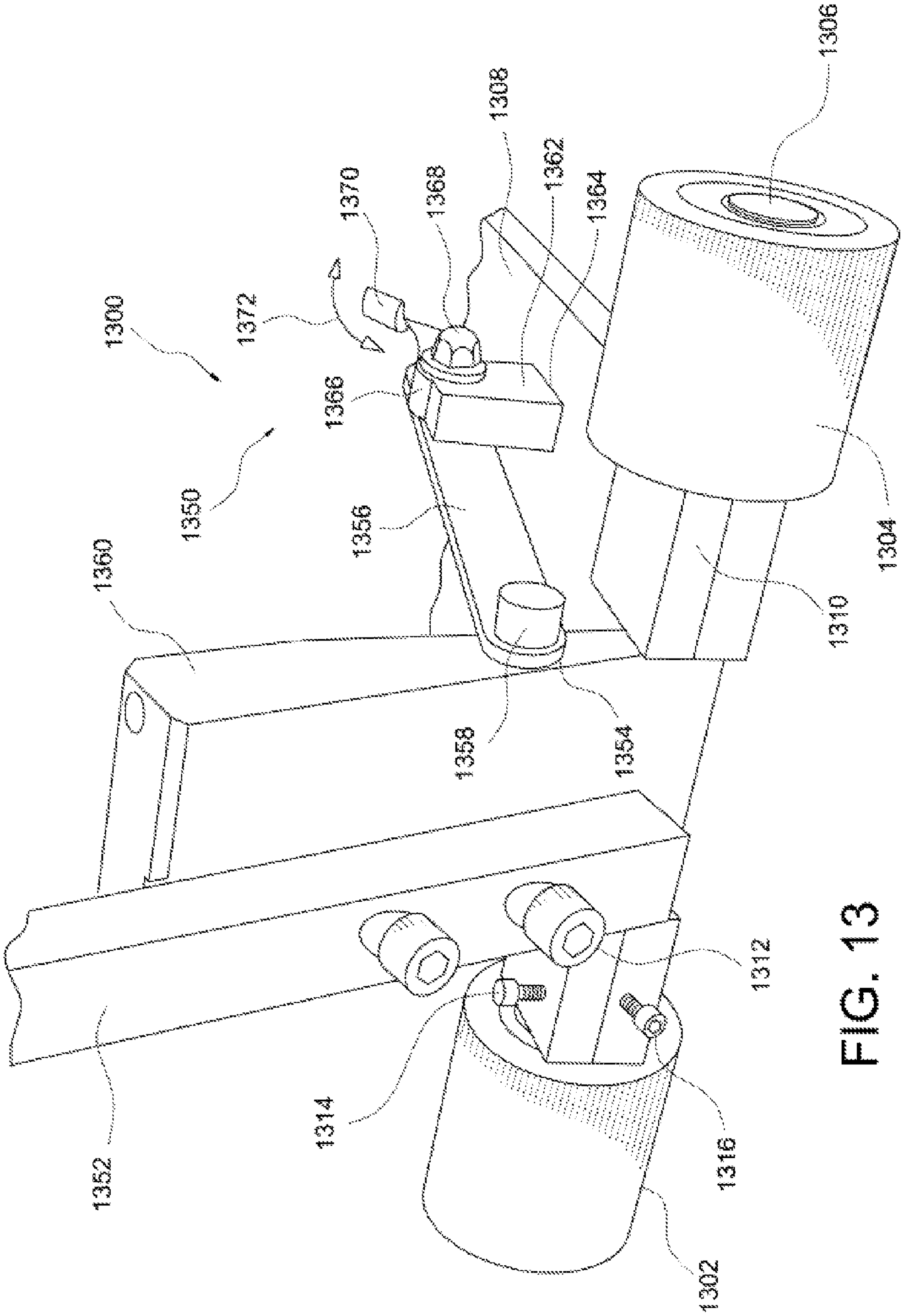
FIG. 13 shows in posterior perspective view certain further portions of a saw prepared according to principles of the invention.

FIG. 13 shows, in a partial schematic perspective view, further aspects of a saw assembly 1300 according to principles of the invention. In particular, FIG. 13 shows first 1302 and second 1304 rear wheels of a saw assembly 1300. The rear wheels mutually support a rear axle 1306. The rear axle 1306 is disposed coaxially through both wheels and traverses the distance between the wheels as a single member. The rear axle 1306 is disposed within a lateral groove provided in the chassis 1308 and is coupled within the groove by first 1310 and second 1312 bearing blocks.

It will be understood that the groove and bearing blocks, according to certain embodiments, exhibit a desirable tolerance so that the angle and location of the axle 1306 with respect to the chassis 3008 and within the groove can be modified. As illustrated, this modification is achieved by adjusting the respective settings of two adjusting screws—a vertical adjusting screw 1314 and a horizontal adjusting screw 1316. While the illustrated embodiment shows adjusting screws only on the left side of the rear axle, in other embodiments, adjusting screws will be provided on the right side of the rear axle or on both sides of the rear axle. In addition, in other embodiments, adjusting screws will be provided for the front axle.

In other embodiments, the grooves and bearing blocks will be provided with negligible tolerance and no adjustment of the axle will be provided or necessary, or adjustment may be made by physical distortion of the chassis. In such an embodiment, cap screw 1316 may nevertheless be retained and used as a rear pointer for alignment with a chalk line or with a previously cut kerf, and to maintain a desired direction of the saw during operation.

The above-described adjustment of the axle 1306 allows for a desirable alignment of a longitudinal axis of the rear axle with a corresponding longitudinal axis of a front axle. That is, in a desirable configuration according to one embodiment of the invention, the respective longitudinal axes of the front axle and rear axle 1306 are disposed in substantially parallel spaced relation to one another once the adjustment process is complete. This configuration is helpful in maintaining a saw apparatus that readily cuts a straight line through a substrate such as concrete without deviating and with a minimum of guidance from an operator. Moreover, by maintaining this alignment, it is possible to ensure that the bulk of the cutting that occurs takes place at a leading edge of the saw blade where the saw blade first contacts the concrete and where the vacuum manifold described above is well positioned to capture any dust produced.

At the same time, contact between any other portion of the blade, and particularly its trailing edge, with the substrate is avoided, thus minimizing the generation of concrete dust at any location remote from the vacuum manifold. In light of the present teaching, it will thus be apparent to one skilled in the art that, quite surprisingly, an effective mechanism for securing a desirable alignment relationship between the front and rear axles of the saw provides a remarkable benefit in terms of improving the capture of saw dust produced by other apparatus provided for that purpose.

FIG. 13 also shows additional detail of an adjustment mechanism 1350 for adjusting and angle of the handle 1352 with respect to the chassis 1308. It will be understood that adjustment of the handle 1352 in this manner will allow the entire apparatus to be comfortably and effectively controlled by operators of various statures and with various preferences. In the illustrated embodiment, the adjustment mechanism 1350 includes a pivotal coupling 1354 at a rear end of a fixing member 1356. In the illustrated embodiment, the pivotal coupling includes, for example, a bolt 1358 threadingly disposed within a lateral hole in a handle coupling feature 1360. One of skill in the art will appreciate, however, that a variety of alternative devices will be employed in various embodiments of the invention, such devices including, without limitation, pins, hinges, and cam followers, among others.

At a front end of the fixing member 1356 is a support pillar 1362. The support pillar is substantially fixedly coupled at a lower end 1364 to an upper surface of chassis 1308. In certain embodiments, a lower end of the support pillar 1362 is disposed within a recess of the upper surface of chassis 1308. In particular embodiments, this recess will have a depth of 190 thousandths of an inch. In certain embodiments, a particular pillar will be replaceable by another pillar of different dimensions to accommodate a different saw assembly. It should be noted that various pillars (i.e. saw mounting supports, and handle stanchions will be sold as replacement kits appropriate to the application of a particular saw assembly.

A through hole is arranged at an upper end 1366 of the pillar 1362. Disposed within the through hole is, for example, a shaft or bolt with a fixing device 1368 at one end. In the illustrated embodiment, the fixing device is shown as a cap nut (otherwise known as an acorn nut) and washer combination. One of skill in the art, having been provided with the present disclosure will appreciate, however, that a wide variety of other devices may be used in place of the shaft, nut and washer combination.

A tightening lever 1370 is provided such that the tightening lever is also supported by the shaft or bolt and arranged so that rotating the lever 1372 in a first direction and a second direction will, respectively, tighten and loosen the adjustment mechanism 1350. Presented with FIG. 13 and the description above, one of skill in the art will readily understand that tightening the lever 1370 will effectively fix handle 1352 at a particular desirable angle whereas loosening the fixing lever will allow the handle to be adjusted to a different desired angle.

Figure 14:
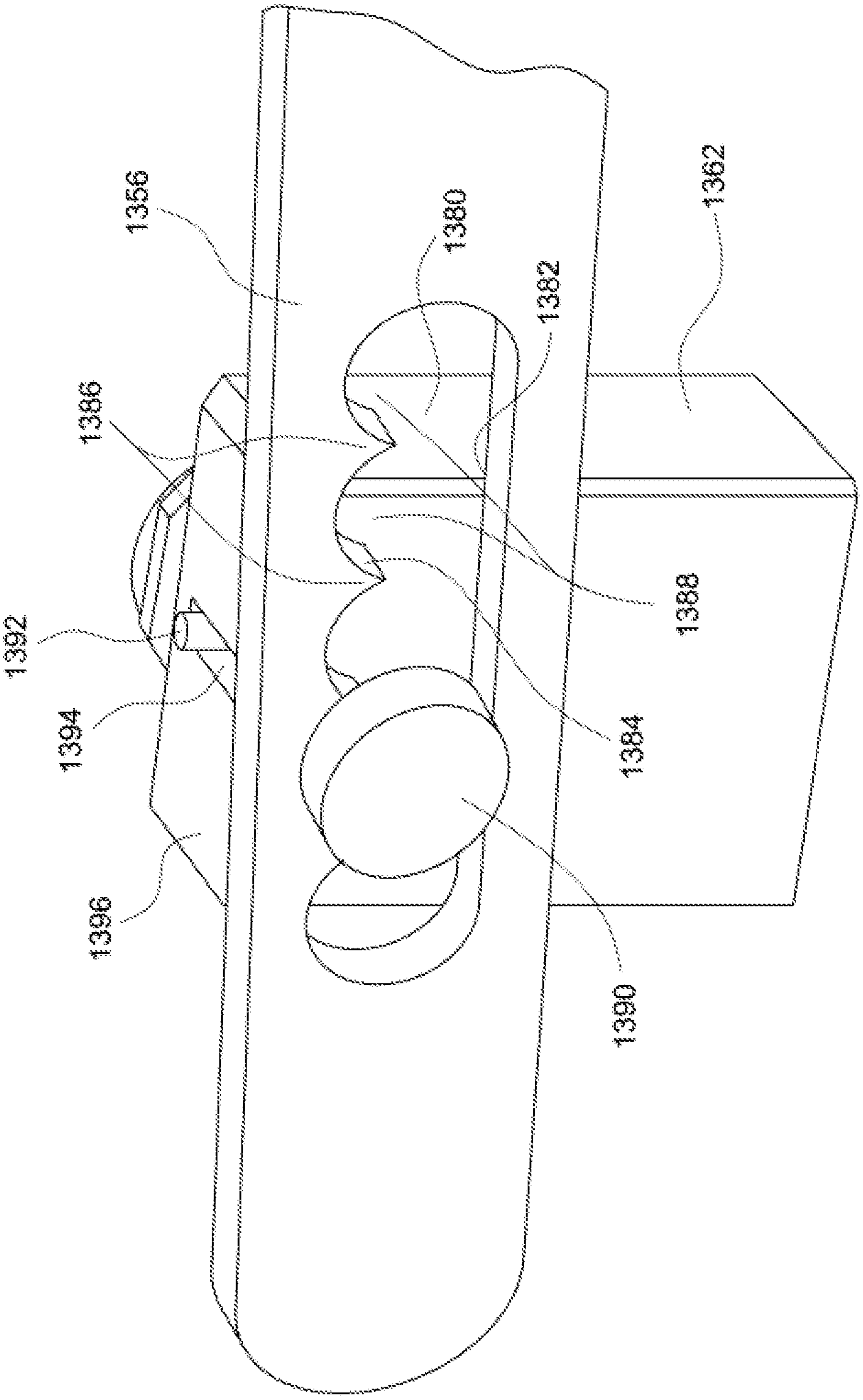
FIG. 14 shows in schematic perspective view additional features of a saw prepared according to principles of the invention.

FIG. 14 shows a further aspect of the relationship between fixing member 1356 and pillar 1362. In particular, one sees that, in the illustrated embodiment, the fixing member 1362 includes a slot 1380 defined at a lower edge by a substantially linear internal surface region 1382 of fixing member 1356 and at an upper edge by a scalloped surface region 1384. This scalloped surface region 1384 includes a first plurality of projections 1386 and a second plurality of intervening recesses 1388.

The projections and recesses together serve to provide preferred locations for coupling the fixing member 1356 to a corresponding external surface region of the bolt or shaft described above. Thus, in the illustrated embodiment, the angle of the handle 1352 will be readily set at a finite number of preferred values, corresponding to the recesses 1388, and will be retained at these preferred values with substantially greater strength than would otherwise be possible (i.e., if upper surface region 1384 were linear rather than scalloped).

Also visible is an expanded region, or head 1390, of the bolt or shaft that serves to retain the bolt within the slot 1380 and draws the fixing member 1356 towards an external surface region of the pillar 1362 to effect a frictional fixation when the lever 1370 described with respect to FIG. 13 is tightened.

Finally, it should be noted, that a pin 1392 is coupled radially to the bolt at an intermediate position thereof, and is disposed within a slot 1394 of the pillar 1362. The slot communicates between an upper surface 1396 of the pillar 1392 and an internal surface of the pillar, which internal surface defines the hole or bore within which the bolt is disposed. The pin 1392 serves to capture the bolt so as to prevent rotation when the lever 1370 is actuated. This results in an effective interference between the internal threads of the lever and the external threats of the bolt, so that the bolt can be readily tightened by actuating the lever without otherwise grasping the bolt to prevent rotation.

In the illustrated embodiment, the pin 1392 is shown as a roll pin or spring pin, but one of skill in the art will appreciate that a wide variety of other devices will be used in corresponding embodiments of the invention. For example, the bolt may include the pin as an integrated feature, welded for example to an external circumferential surface of the bolt. In light of the present disclosure, the value of using the above described arrangement will be readily apparent to one of skill in the art.

In light of the foregoing description, the blade depth adjustment mechanism, shown as 122 in FIG. 1 will also be readily understood by one of ordinary skill in the art. It should be also noted, however, that blade depth adjustment can be effected by other appropriate means including, for example, an automatic electrical linear actuator, a hydraulic actuator, a pneumatic actuator, a worm drive or ballscrew actuator, or any other appropriate apparatus or method that is known or comes to be known in the art.

Figure 15:
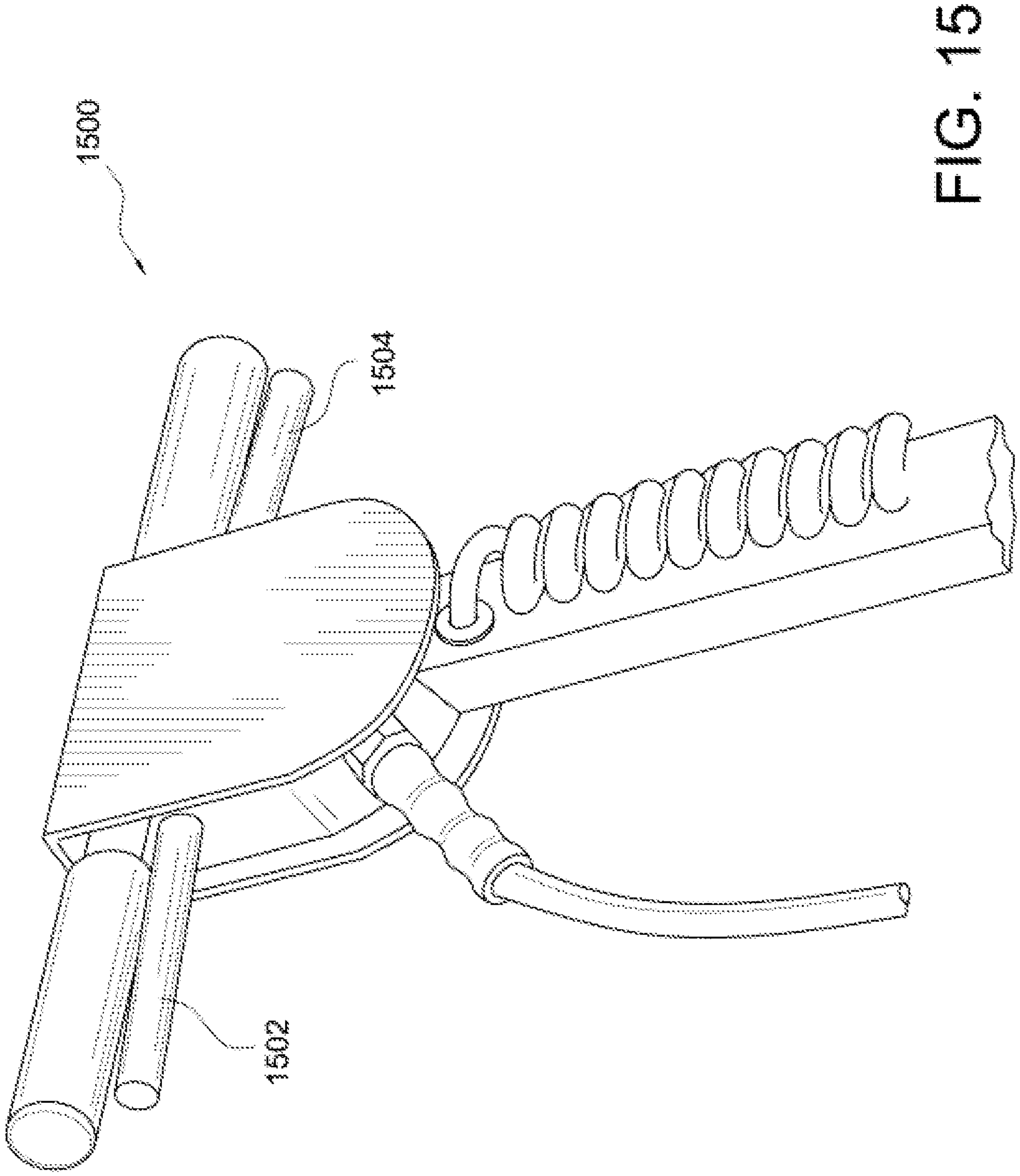
FIG. 15 shows in schematic perspective view still more features and details of a saw prepared according to principles of the invention.
Figure 16:
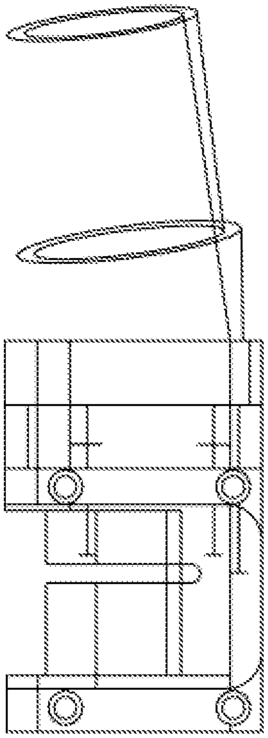
FIGS. 16-23 show, in schematic view, various exemplary aspects of portions of a saw prepared according to principles of the invention.
Figure 17A:
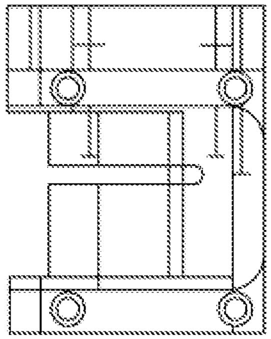
Figure 17B:
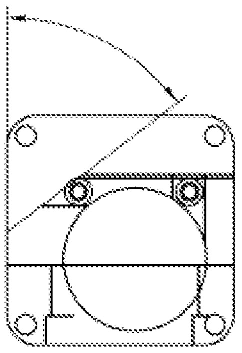
Figure 18A:
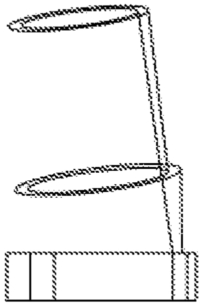
Figure 18B:
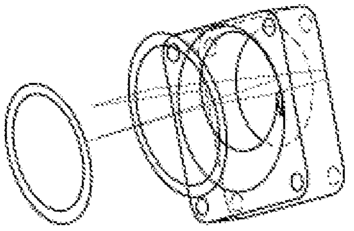
Figure 18C:
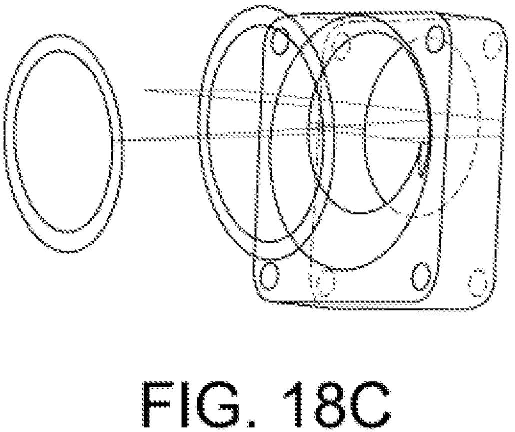
Figure 18D:
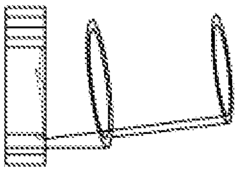
Figure 19A:
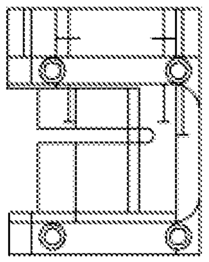
Figure 19B:
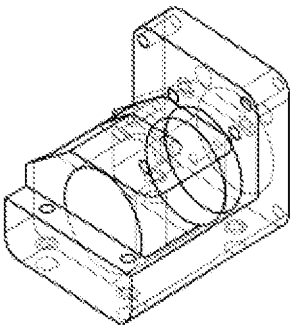
Figure 19C:
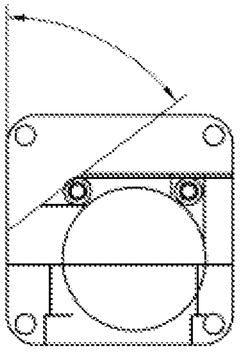
Figure 19D:
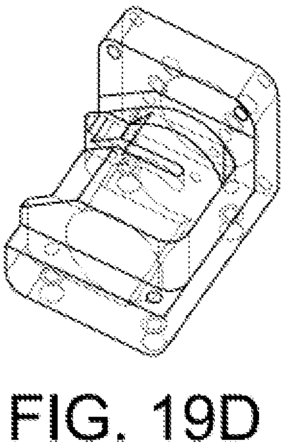
Figure 20:
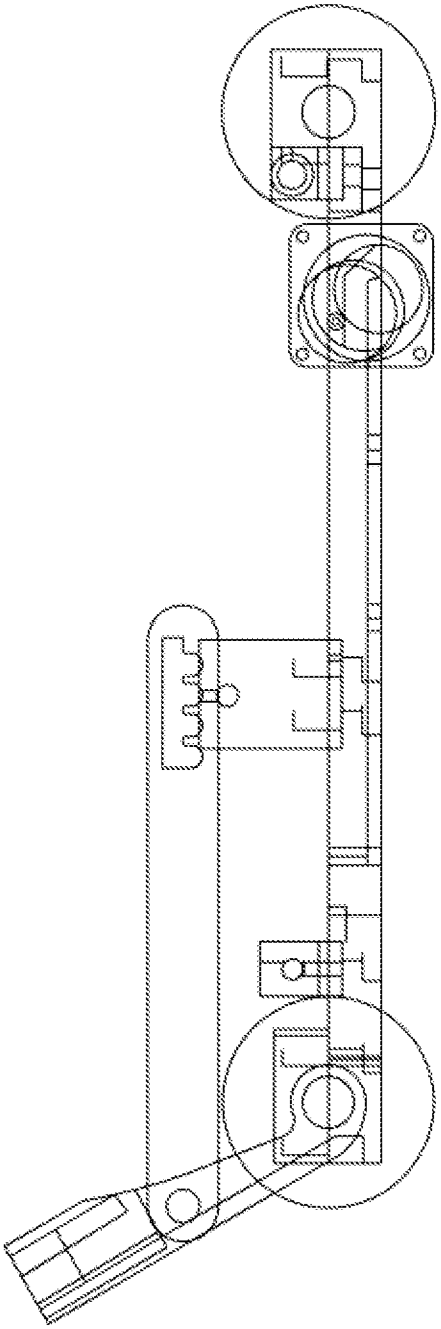
Figure 21:
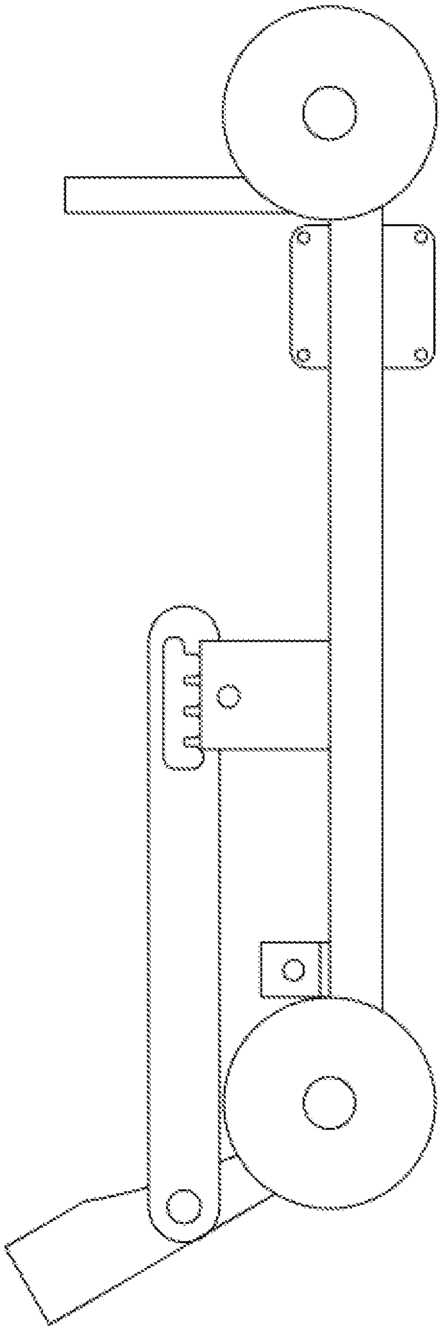
Figure 22:
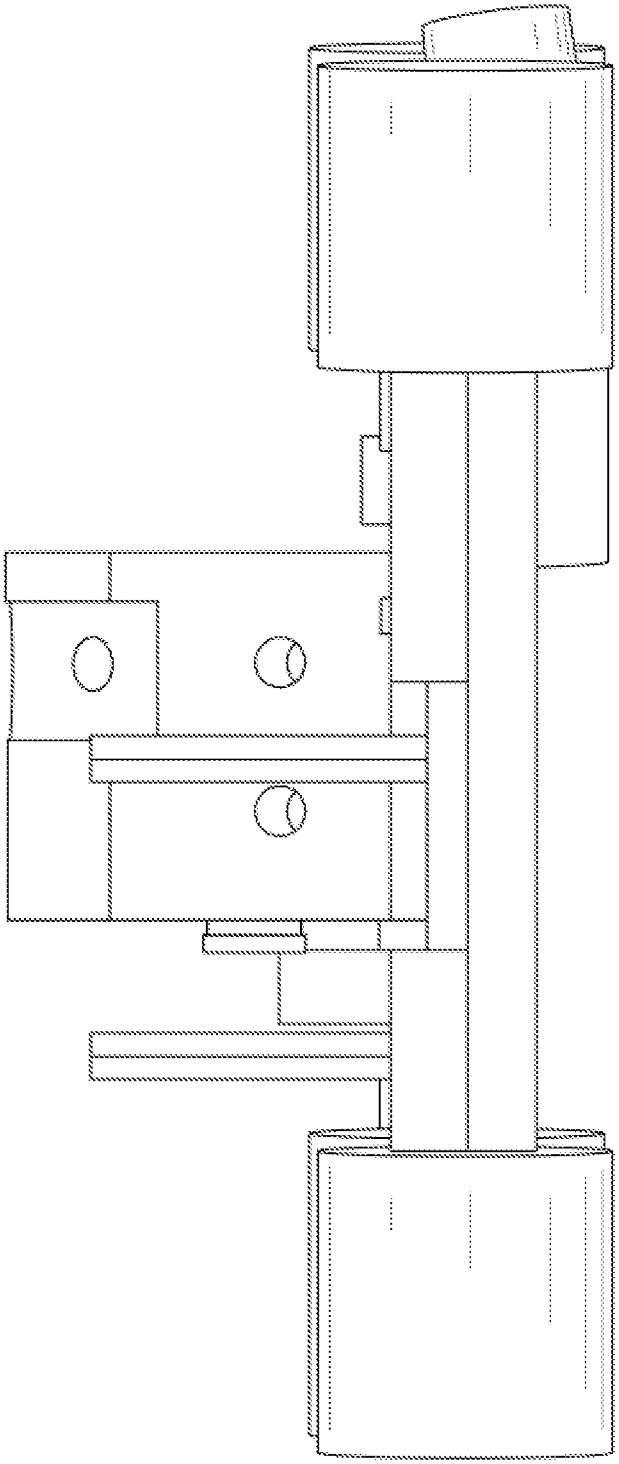
Figure 23:
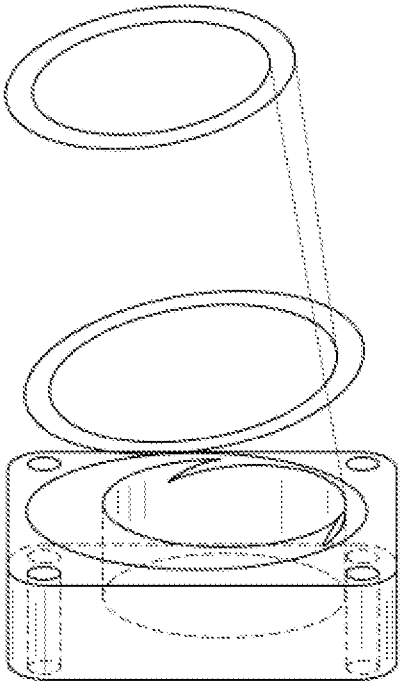

FIG. 15 shows, in further detail, a portion of a handle 1500 according to certain embodiments of the invention. The handle includes, for example, first 1502 and second 1504 control levers for activating the motor of the saw. In this way, an operator can readily use either his left hand or his right hand to operate the saw and, because of the weight balance effected by, e.g., weights 138-140 and the alignment of the wheels effected by, e.g., alignment screws 1314 and 1316, such one-handed operation is well within the operational capability of many embodiments of the invention.

Referring again to FIG. 1, the reader will note a mounting pillar 150 supported by the chassis 102. In the illustrated embodiment, saw portion 114 is pivotally coupled to mounting pillar 150 by a laterally mounted bolt or shaft. One of skill in the art will appreciate that adjusting mechanism 122 will be operated by rotating lever 152 so as to loosen or tighten a coupling between the lever and saw portion 114. Accordingly, saw portion 114 may be pivoted such that the lever and the related coupling will slide in arcuate fashion along the illustrated arcuate slot, whereby the saw pivots about the laterally mounted bolt or shaft. The result is that the depth of cut of the blade 118 is adjusted and the desired setting is readily locked. As noted above, this motion, in conjunction with cam follower 130, automatically causes the correct adjustment of the blade cover 132.

FIGS. 16-23 illustrate further aspects of portions of a saw according to principles of the invention. It should be understood that the illustrated proportions are merely exemplary, and that other dimensions and lengths will be advantageously employed according to the requirements of a particular application.

In describing above various embodiments of the invention, the Applicants have made reference to a saw including four wheels. The reader will appreciate that other arrangements of wheels including arrangement having one, two or three wheels and arrangements having more than four wheels will also fall within the scope of the invention. Also, apparatus using alternatives to wheels such as, for example, sliding support mechanisms, air bearing support mechanisms, caterpillar tracks, walking beam and articulated legs, among others are also contemplated as being within the scope of the invention.

In various embodiments, the wheels will include bearings such as are known in the art including, for example, sealed bearings. The bearings may be of any form such as is known or may become known in the art including, for example, ball bearings, roller bearings, sintered bushings, polymer bushings, and fluid bearings, among others. Bearings including one or more of ceramic material, polymer material, and metallic material, among others are contemplated. Also, in various embodiments, the wheels will include tires of form and composition appropriate to a particular application. In certain embodiments, the tires will include a natural or synthetic polymer material such as, for example, an elastomeric polymer such as, for example, polyurethane.

While the illustrated embodiments have primarily discussed the placement of a vacuum manifold at a leading-edge of a circular saw blade, it will be understood that other arrangements and configurations fall within the spirit and scope of the invention. For example, a vacuum manifold can also be placed adjacent to a trailing edge of the saw blade (i.e., adjacent to a point where the rotating saw blade departs the kerf, moving upward) instead of at a leading-edge.

It will be appreciated that the various aspects of the apparatus and method described above, taken individually, in subcombinations, and in totality, will, in various embodiments, provide a system and apparatus that is highly effective at capturing dust and particulate matter, while being lighter, more transportable, readily operated, and in many ways superior to the technology previously available. These advantages are seen both in the immediate operation of the system and apparatus, and in the savings resulting from the ability to reduce or eliminate secondary cleanup operations.

In still further embodiments, two separate vacuum manifold are disposed at the leading-edge and the trailing edge respectively. In yet another arrangement within the scope of the invention, a single distributed manifold is arranged to collect dust at both the leading-edge and the trailing edge and in a region in between the leading and trailing edges. In still another embodiment of the invention, additional evacuation of material is performed by capturing dust from within a shield between the leading and trailing edges and above a top edge of the saw blade (i.e. an edge diametrically opposite from the portion of the saw blade disposed within the kerf).

While the exemplary embodiments described above have been chosen primarily from the field of linear concrete sawing, one of skill in the art will appreciate that the principles of the invention are equally well applied, and that the benefits of the present invention are equally well realized in a wide variety of other material processing applications including, for example, asphalt processing, wood processing, plastic processing, masonry processing, glass processing, ceramic processing, and metal processing, among others. Further, while the invention has been described in detail in connection with the presently preferred embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Accordingly, the invention is not to be seen as limited by the foregoing description, but is only limited by the scope of the appended claims.

The invention claimed is:

1. A method of cutting a substrate comprising:

advancing a portion of a saw blade into a kerf in a surface of a substrate at an entry point;

advancing said portion of said saw blade through said kerf, substantially without contacting said substrate, to contact said substrate adjacent an exit point where said portion of said saw blade exits said kerf and relatively remote from said entry point;

advancing said portion of said saw blade into a vacuum manifold, said vacuum manifold being disposed relatively proximate to said exit point and distal to said entry point;

advancing said portion of said saw blade through a cavity within said vacuum manifold, said cavity defined by a generally circular cylindrical internal surface of said vacuum manifold, said cavity having a cavity longitudinal axis disposed in generally parallel spaced relation to an axis of rotation of said saw blade and transverse to a motion of said portion of said saw blade through said cavity, said cavity having a radius normal to said cavity longitudinal axis, said cavity radius being substantially smaller than a radius of said saw blade;

withdrawing ambient air through said cavity and through a coupling portion coupled to said cavity, said coupling portion having a coupler longitudinal axis, said coupler longitudinal axis defining a passage angle with said cavity longitudinal axis, said passage angle having a value of between at least about 0° and at most about 20°, whereby said withdrawing ambient air tends to form a vortex in said ambient air and to effectively remove sawing detritus from a region adjacent said exit point.

2. A method of cutting a substrate as defined in claim 1 wherein said passage angle comprises a vertical component substantially normal to said surface of said substrate and a horizontal component substantially parallel to said surface of said substrate.

3. A method of cutting a substrate as defined in claim 2 wherein said vertical component has a value of between at least about 0° and at most about 10°.

4. A method of cutting a substrate as defined in claim 2 wherein said horizontal component has a value of between at least about 0° and at most about 10°.

5. A method of cutting a substrate as defined in claim 2 wherein said vertical component has a value of between at least about 0° and at most about 10° and said horizontal component has a value of between at least about 0° and at most about 10°.

6. A method of cutting a substrate as defined in claim 2 wherein said vertical component has a value of approximately 7° and said horizontal component has a value of approximately 7°.

7. A method of cutting a substrate as defined in claim 1 wherein said cavity has a blade location ratio of between at least about 20% and at most about 80%.

8. A method of cutting a substrate as defined in claim 1 wherein said cavity has a blade location ratio of at least about 66%.

9. A method of cutting a substrate as defined in claim 1 wherein said entry point and said exit point are instantaneously found within a region of said surface of said substrate defined by respective centroids of four wheels, said four wheels being disposed in contact with said surface to support said blade.

10. A method of cutting a substrate as defined in claim 1 wherein said substrate includes at least one of a concrete material and a polymeric material.

11. A method of cutting a substrate as defined in claim 1 further comprising advancing said blade forward against said substrate, away from said entry point and towards said exit point.

12. A method of cutting a substrate as defined in claim 1 wherein a lower surface of said vacuum manifold is disposed at least about 1 inch above said surface of said substrate.

13. A method of cutting a substrate as defined in claim 1 wherein a lower surface of said vacuum manifold is disposed at least about ½ inch above said surface of said substrate.

14. A method of cutting a substrate as defined in claim 1 wherein a lower surface of said vacuum manifold is disposed substantially in sliding contact with said surface of said substrate.

15. A method of cutting a substrate as defined in claim 1 further comprising disposing a removable weight on an apparatus, said apparatus being pivotally coupled to said saw blade, said weight serving to promote a desirable alignment of said portion of said saw blade within said kerf.

16. An apparatus for cutting a substrate according to the method of claim 1, said apparatus comprising:

a chassis having a forward edge and a rearward edge and an upper chassis surface region;

four wheels arranged and configured to support said chassis with respect to said surface of said substrate such that said upper chassis surface region is disposed in generally parallel spaced relation to a surface of said substrate;

an internal edge of said chassis surface region, said internal edge defining an aperture of said upper chassis surface region, said aperture being adapted to receive a portion of a blade rotatably therethrough, said aperture being disposed inwardly of said four wheels and between said forward edge and said rearward edge;

said chassis supporting a vacuum manifold adjacent said forward edge of said saw blade, said vacuum manifold having a slot therein, said slot being arranged and adapted to receive a portion of said blade rotatably therethrough;

a handle, said handle being coupled to said chassis adjacent said rearward edge; and a removable weight, said removable weight being adapted to be coupled to said chassis adjacent said forward edge.

17. A saw for cutting concrete comprising:

a circular saw blade;

a chassis having a forward edge and a rearward edge and an upper chasis surface region, said upper chassis surface region being disposed substantially perpendicular to a plane of said circular saw blade;

four wheels, said four wheels being arranged and configured to support said chassis with respect to a surface of concrete to be cut, such that said upper chasis surface region is disposed in generally parallel spaced relation to said surface of said concrete;

an internal edge of said upper chassis surface region, said internal edge defining an aperture of said upper chassis surface region, said aperture being adapted to receive a portion of said circular saw blade rotatably therethrough, said aperture being disposed inwardly of said four wheels and between said forward edge and said rearward edge;

said chassis supporting a vacuum manifold adjacent said forward edge of said circular saw blade, said vacuum manifold having a generally circular cylindrical internal cavity therewithin, said internal cavity having a cavity longitudinal axis, said vacuum manifold having a hose coupling portion, said hose coupling portion having a hose coupling longitudinal axis, said cavity longitudinal axis and said hose coupling longitudinal axis defining a coupling angle therebetween, said vacuum manifold having a slot therein, said slot being arranged and adapted to receive said portion of said blade rotatably therethrough;

a handle, said handle being coupled to said chassis adjacent said rearward edge; and a removable weight, said removable weight being adapted to be coupled to said chassis adjacent said forward edge.

18. A saw for cutting concrete as defined in claim 17 wherein said coupling angle comprises an angle having a value within a range from between about 0° and about 20°.

19. A saw for cutting concrete as defined in claim 17 wherein said vacuum manifold has an aperture ratio of between 50% and 200%.

20. A saw for cutting concrete as defined in claim 17 wherein said coupling angle comprises a first vertical component having a value of at least about 7.11° and a second horizontal component having a value of at least about 7.11°.

21. A saw for cutting concrete as defined in claim 17 wherein said removable weight includes a plurality of weights, said plurality of weights being selectable to optimize an orientation of said circular saw blade within a kerf resulting from said cutting of said concrete.

* * * * *